(12) United States Patent
Suzuki et al.

(10) Patent No.: US 7,502,147 B2
(45) Date of Patent: Mar. 10, 2009

(54) IMAGE POSITION CORRECTING METHOD, IMAGE POSITION CORRECTING JIG, AND IMAGE FORMATION DEVICE

(75) Inventors: Masakazu Suzuki, Yamatokoriyama (JP); Kouichi Etou, Nara (JP); Kazunori Miyamoto, Kashihara (JP); Motohiro Hayashi, Nara (JP); Yoshikazu Kondoh, Izumiotsu (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 649 days.

(21) Appl. No.: 10/557,179

(22) PCT Filed: May 19, 2004

(86) PCT No.: PCT/JP2004/006741

§ 371 (c)(1),
(2), (4) Date: Nov. 17, 2005

(87) PCT Pub. No.: WO2004/105378

PCT Pub. Date: Dec. 2, 2004

(65) Prior Publication Data

US 2006/0285182 A1    Dec. 21, 2006

(30) Foreign Application Priority Data

May 21, 2003 (JP) ............................. 2003-144072
Jun. 12, 2003 (JP) ............................. 2003-168060

(51) Int. Cl.
*H04N 1/46* (2006.01)
*H04N 1/00* (2006.01)
*H04N 1/04* (2006.01)

(52) U.S. Cl. ................. 358/504; 358/405; 358/406; 358/474

(58) Field of Classification Search .......... 358/504, 358/405, 406, 532, 474
See application file for complete search history.

(56) References Cited

U.S. PATENT DOCUMENTS

| | | | |
|---|---|---|---|
| 6,005,587 A | 12/1999 | Takahashi et al. | |
| 6,226,419 B1 * | 5/2001 | Lodwick et al. | 382/294 |
| 7,106,477 B2 * | 9/2006 | Horobin | 358/1.9 |
| 7,388,687 B2 * | 6/2008 | Hatakeyama | 358/1.9 |
| 2008/0226361 A1 * | 9/2008 | Tomita et al. | 399/301 |

FOREIGN PATENT DOCUMENTS

| | | |
|---|---|---|
| JP | 8-265560 A | 10/1996 |
| JP | 10-186994 A | 7/1998 |
| JP | 11-41414 A | 2/1999 |

* cited by examiner

*Primary Examiner*—Twyler L Haskins
*Assistant Examiner*—Fred Guillermety
(74) *Attorney, Agent, or Firm*—Birch, Stewart, Kolasch & Birch, LLP

(57) ABSTRACT

Paper (41) on which a first reference image (31) is formed in an image forming section (300), and a correction instrument (1) on which a second reference image (33) is formed, are placed at predetermined positions on an original platen (210). Reference images (31, 33) are read as an image for correction by an image reading section (200). An error in the image reading section (200) is measured based on the second reference image (33) of the correction image. The first reference image (31) of the correction image is used to remove the error in the image reading section (200) from the measured error, resulting in an error in the image forming section (300).

23 Claims, 16 Drawing Sheets

FIG.3
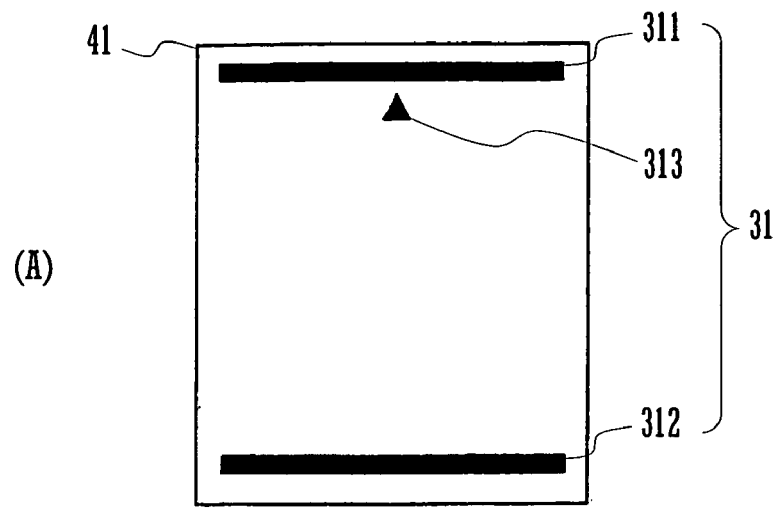
(A)
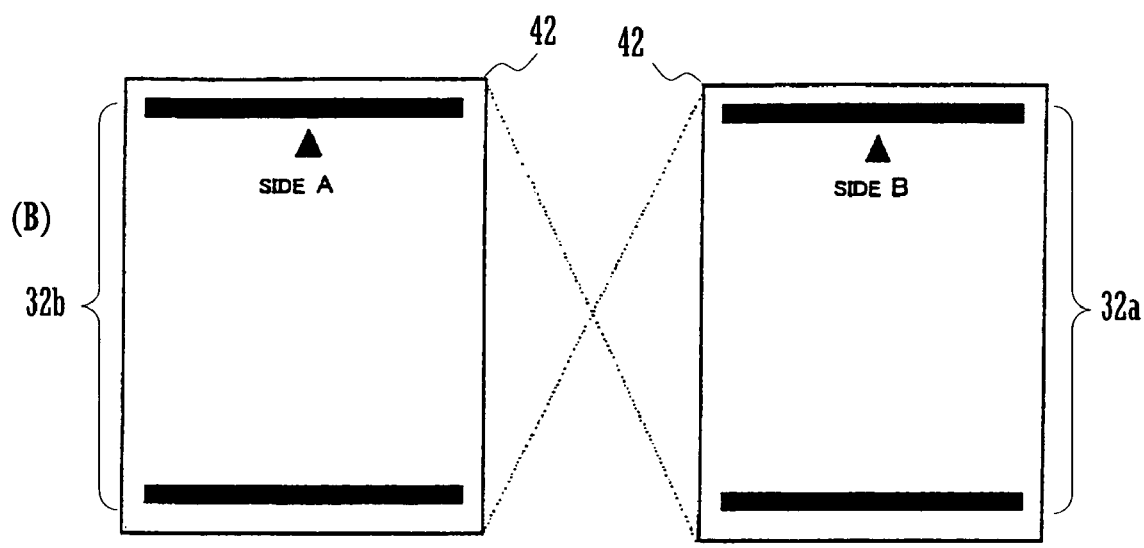
(B)
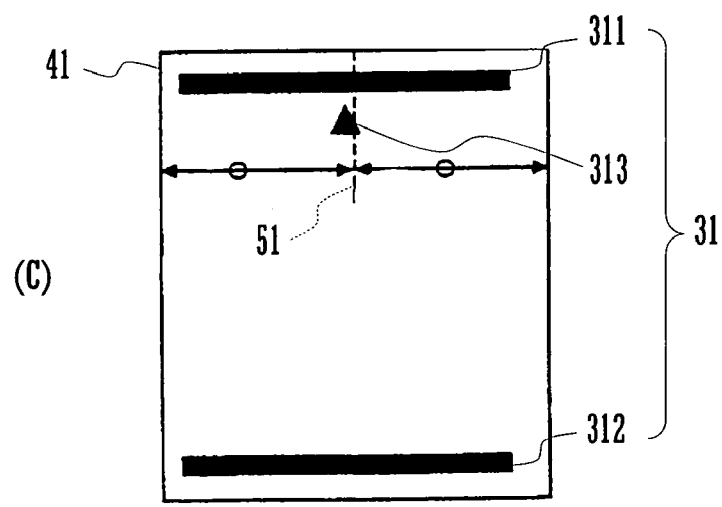
(C)

FIG.16
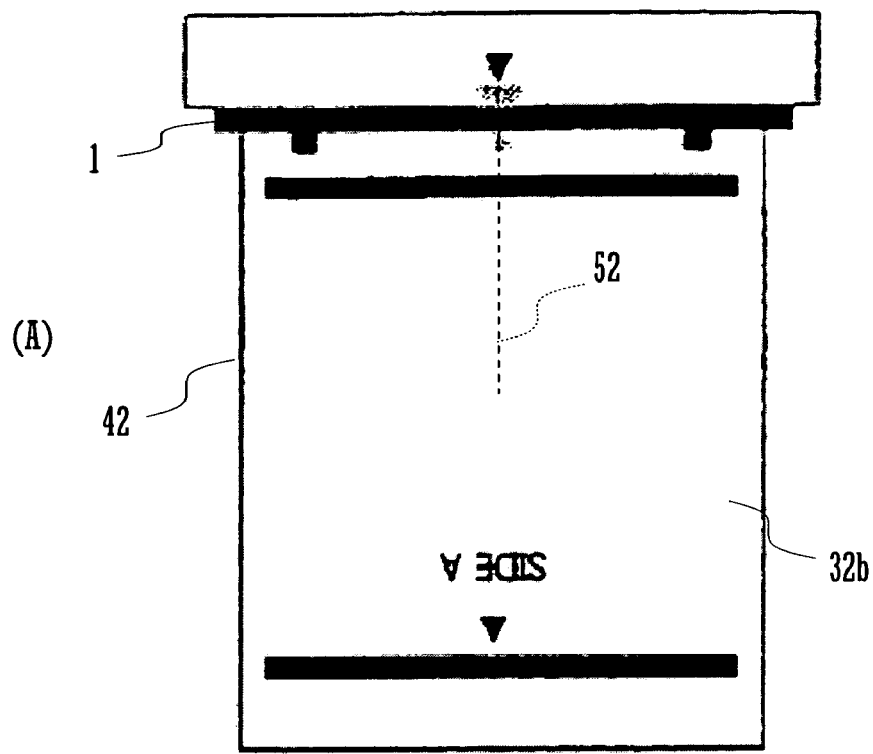
(A)
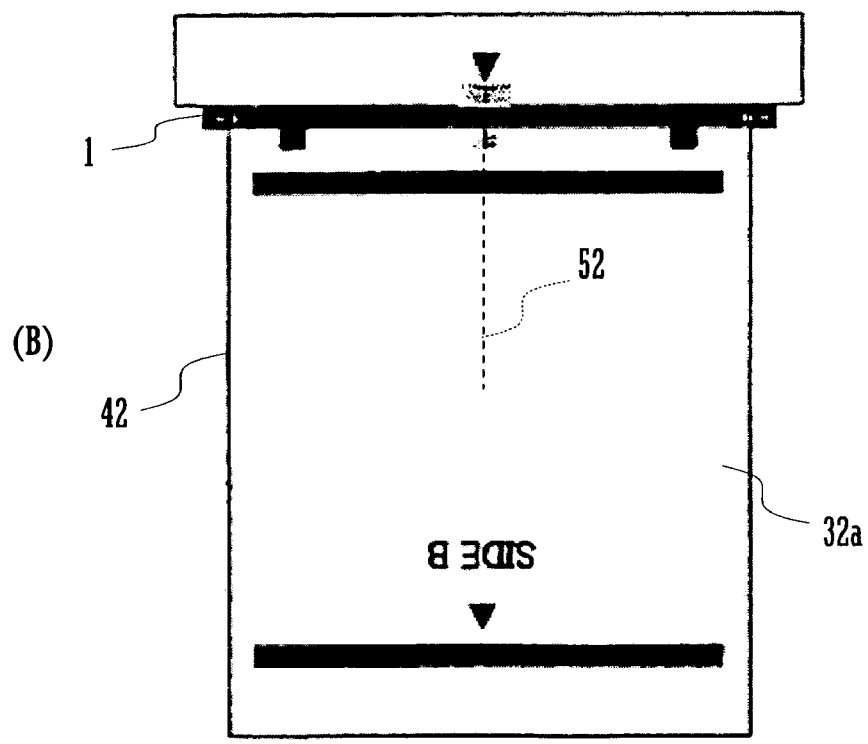
(B)

IMAGE POSITION CORRECTING METHOD, IMAGE POSITION CORRECTING JIG, AND IMAGE FORMATION DEVICE

TECHNICAL FIELD

The present invention relates to an image position correcting method for correcting errors in an image position and an image scaling factor in an image forming apparatus, an image position correcting instrument for use in this method, and an image forming apparatus to which this method is applied.

BACKGROUND ART

In order to correct an error in an image position when an image forming section of an image forming apparatus forms an image, there is a known method of repeating an image forming process with respect to a reference image stored in a memory within the image forming apparatus, and a task of inputting a correction value by the user. In this technique, the user visually compares an output image which is formed and output by the image forming apparatus performing an image forming process with respect to the reference image, with the reference image, to measure an error in the image position, inputs into the image forming apparatus a correction value which is considered to be appropriate for correction of the measured error, and thereafter, causes the image forming apparatus to perform an image forming process with respect to the reference image. The user repeats this procedure until the error falls within a tolerable range. Therefore, the user needs to not only determine a correction value in consideration of the measurement result of an error, but also repeat the image forming process with respect to the reference image until the error falls within the tolerable range, resulting in a waste of resource and a longer time required for the task.

To avoid this, there is a conventional image forming apparatus that detects a difference between the image position of an output image of an original image and the image position of the original image, and adjusts a draw start position of an image on a laser exposing apparatus (see, for example, Patent document 1). Note that the draw start position is stored in the image forming apparatus.

When the reference image read from a read original by an image reading section is compared with an output image formed by the image forming section with respect to the reference image, errors in an image position and an image scaling factor of an output image with respect to the reference image (read original) are caused by, specifically, errors in an image read position and an image read scaling factor when an image is read in the image reading section, and errors in an image formation position and an image formation scaling factor when an image is formed in the image forming section. In other words, the errors in the image forming section of the image forming apparatus and the errors in the image reading section of the image forming apparatus are combined to provide the errors in the image position and the image scaling factor as a whole.

To avoid this, there is another conventional image forming apparatus that reads a predetermined reference image in an image reading section and calculates a correction value for an image read scaling factor, and thereafter, performs image formation with respect to a reference image in an image forming section to create an output image, and causes the image reading section to read the output image and calculating a correction value for an image formation scaling factor (see, for example, Patent document 2). This image forming apparatus calculates an error in the image forming section and an error in the image reading section of the image forming apparatus, separately.

However, in the image forming apparatus of Patent document 1, the image read position error in the image reading section and the image formation position error in the image forming section are not separated. Therefore, when one of the image forming section and the image reading section is not used, the image position error and the image scaling factor error cannot be accurately corrected.

In the image forming apparatus of Patent document 2, even when one of the image forming section and the image reading section is not used, the image position error and the image scaling factor error can be accurately corrected. However, it is necessary to read both the reference image and the output image in the image reading section, resulting in a complicated task of correcting the image position and the image scaling factor.

Further, there is an image forming apparatus capable of selectively performing a fixed original type image reading process of reading an image by scanning an original placed on an original platen using an optical system of an image reading section, the optical system being provided facing the original platen, and a moving original type image reading process of reading an image of an original which is being transferred and moved, where an optical system of an image reading section is provided facing the original via the original platen. In such an image forming apparatus, an error occurring in the image reading section during the fixed original type image reading process and an error occurring in the image reading section during the moving original type image reading process need to be corrected separately. Therefore, in the image forming apparatus of selectively performing the fixed original type image reading process and the moving original type image reading process, the task of correcting the image position and the image scaling factor is more complicated.

An object of the present invention is to provide an image position correcting method, an image position correcting instrument, and an image forming apparatus capable of correcting errors in an image read position and an image read scaling factor in an image reading section and errors in an image formation position and an image formation scaling factor in an image forming section, separately, by performing an image reading process once and an image forming process once, thereby making it possible to perform a task of accurately correcting an image position and an image scaling factor simply and quickly.

Another object of the present invention is to provide an image position correcting method and an image forming apparatus capable of correcting errors in an image read position and an image read scaling factor in an image reading section during each of a fixed original type image reading process and a moving original type image reading process, and errors in an image formation position and an image formation scaling factor in an image forming section, separately, by performing a fixed original type image reading process, a moving original type image reading process, and an image forming process once for each, thereby making it possible to perform a task of accurately correcting an image position and an image scaling factor simply and quickly.

Patent document 1: JP H10-186994 A

Patent document 2: JP H08-265560 A

DISCLOSURE OF THE INVENTION

The present invention provides means for solving the above-described problems which including the following features.

(1) An image position correcting method, including:

a reference image forming step in which an image forming section forms an image on a sheet based on a first reference image, the first reference image including an image which is used for measurement of an image formation position error and an image formation scaling factor error;

a correction image reading step in which an image reading section reads, as an correction image, the image of the sheet along with an image of a reference object based on which a second reference image is formed, the second reference image including an image for use in measurement of an image read position error and an image read scaling factor error, the sheet and the reference object being placed at respective predetermined positions on the original platen;

an image reading section error measuring step in which a control section measures the image read position error and the image read scaling factor error, based on a difference between the second reference image and the image of the reference object contained by the correction image; and an image forming section error measuring step in which the control section measures the image formation position error and the image formation scaling factor error, based on a difference between the first reference image and the image of the sheet contained by the correction image with reference to the measured image read position error and image read scaling factor error.

In this feature, an image of paper on which a first reference image including an image which is used for measurement of an error in an image formation position and an error in an image formation scaling factor is formed in the image forming section, is read along with a second reference image including an image for use in measurement of an error in an image read position and an error in an image read scaling factor, the image being provided at an appropriate position on the original platen, as an image for correction, in the image reading section. After an error in the image reading section is measured based on the second reference image of the correction image, an error in the image forming section is measured based on the error in the image reading section and the first reference image of the correction image. Therefore, only by performing an image forming task once and an image reading task once, both an error in the image forming section and an error in the image reading section are measured. Thereby, it is possible to perform a task of accurately correcting an image position and an image scaling factor simply and quickly.

(2) The image position correcting method according to (1), further including, before the reference image forming step, a reference image information inputting step of storing image information concerning the first reference image received from an external apparatus into an internal memory.

In this feature, the image information concerning the first reference image which is formed on paper in the image forming section so as to measure an error in an image formation position and an error in an image formation scaling factor, is supplied from an external apparatus. Therefore, it is not necessary to previously store information for the image position correcting task in the image forming apparatus. Thereby, a standardized image position correcting task can be performed with respect to a number of image forming apparatuses before shipment from a factory, for example.

(3) The image position correcting method according to (1), further including, before the reference image forming step, a reference image information reading step of reading image information concerning the first reference image from an internal non-volatile memory.

In this feature, the image information concerning the first reference image which is formed on paper in the image forming section so as to measure an error in an image formation position and an error in an image formation scaling factor, is read from the non-volatile memory of the image forming apparatus. Therefore, it is not necessary to receive supply of the image information from an external apparatus prior to the start of the image position correcting task. Thereby, the image position correcting task can be performed with any timing, such as at the time for maintenance after installation at a user position.

(4) The image position correcting method according to (1), further including, before the reference image forming step, a reference image information reading step of storing image information concerning the first reference image read from an external recording medium into an internal memory.

In this feature, the image information concerning the first reference image which is formed on paper in the image forming section so as to measure an error in an image formation position and an error in an image formation scaling factor, is read from an external recording medium. Therefore, it is not necessary to previously store the information for the image position correcting task, or receive supply of the image information from an external apparatus prior to the start of the image position correcting task. Thereby, the image position correcting task can be performed with any timing.

(5) The image position correcting method according to (1), further including, between the reference image forming step and the correction image reading step, an original placing step of placing paper on which the first reference image is formed in the reference image forming step, along with via an image correcting instrument having a bottom side on which the second reference image is formed, at a predetermined position on the original platen.

In this feature, the correction image is read when paper on which the first reference image is formed is placed at the predetermined position on the original platen via the image correction instrument on the bottom of which the second reference image is formed. Therefore, the first reference image and the second reference image constituting the correction image are read from the paper and the image correction instrument placed at the predetermined position on the original platen. Thereby, it is possible to accurately perform the image position correcting task using the correction image.

(6) The image position correcting method according to (1), wherein:

the reference image forming step is a step of forming a first reference image including an image indicating a center position in a main scanning direction, an image having a predetermined length in the main scanning direction, and an image having a predetermined length in a subsidiary scanning direction; and the correction image reading step is a step of reading an image on paper, and a second reference image including an image indicating the center position in the main scanning direction, an image having a predetermined length in the main scanning direction, and an image having a predetermined length in the subsidiary scanning direction.

In this feature, as a correction image, the first reference image including an image indicating a center position in the main scanning direction, an image having a predetermined length in the main scanning direction, and an image having a predetermined length in the subsidiary scanning direction, and the second reference image including an image indicating a center position in the main scanning direction, an image having a predetermined length in the main scanning direction, and an image having a predetermined length in the subsidiary scanning direction, are read. Thereby, it is possible to read information which should be used for measurement of the image read position error and the image read scaling factor error in the main scanning direction and the subsidiary scanning direction in the image reading section, and information which should be used for measurement of the image read position error and the image read scaling factor error in the main scanning direction and the subsidiary scanning direction in the image forming section, from the first reference image and the second reference image provided at the predetermined positions on the original platen.

(7) The image position correcting method according to (6), wherein the image reading section error measuring step is a step of comparing the second reference image read by the image reading section in the correction image reading step with the first reference image information stored in the internal memory.

In this feature, the second reference image read by the image reading section is compared with the image in formation concerning the first reference image to measure an error in the image reading section. Thereby, if a predetermined length in the main scanning direction and a predetermined length in the subsidiary scanning direction of an image included in the second reference image are caused to be equal to a predetermined length in the main scanning direction and a predetermined length in the subsidiary scanning direction of an image included in the first reference image, then, based on the result of the comparison, it is possible to measure an error in an image read scaling factor in the image reading section.

(8) The image position correcting method according to (1), wherein the image forming section error measuring step is a step of removing the error in the image forming section measured in the image reading section error measuring step from a result of comparison of the first reference image read by the image reading section in the correction image reading step with image information concerning the first reference image stored in the internal memory.

In this feature, an error in the image reading section is measured by removing an error in the image forming section from a result of comparison of the first reference image read by the image reading section with image information concerning the first reference image. Thereby, by using the first reference image which is read in a state where an error during an image forming task in the image forming section and an error during an image reading task in the image reading section are combined, it is possible to measure the image formation position error and the image formation scaling factor error in the image forming section.

(9) The image position correcting method according to (1), further including:

an image reading section correction information creating step of creating correction information for correcting image information read by the image reading section based on the image read position error and the image read scaling factor error and storing the correction information into an internal memory, after at least the image reading section error measuring step; and an image forming section correction information creating step of creating correction information for correcting image information to be supplied to the image forming section based on the image formation position error and the image formation scaling factor error and storing the correction information into the internal memory, after at least the image forming section error measuring step.

In this feature, the correction information for the image reading section created based on the image read position error and the image read scaling factor error, and the correction information for the image forming section created based on the image formation position error and the image formation scaling factor error, are stored into the internal memory. Thereby, measurement of an error and creation of correction information are not repeated in an ordinary image reading task and an ordinary image forming task, and image information can be corrected using the correction information stored in the internal memory.

(10) The image position correcting method according to (9), wherein the image reading section correction information creating step is a step of creating image reading start position information used when the image information read by the image reading section is read from an image memory, and creating image read scaling factor information used when the image information read by the image reading section is enlarged or reduced in the image memory.

In this feature, the image reading start position information used when the image information read by the image reading section based on the image read position error and the image read scaling factor error is read from the image memory, and the image read scaling factor information used when the image information is enlarged or reduced in the image memory, are created and stored into the internal memory. Thereby, the image information read by the ordinary image reading task can be stored in the image memory, where the image information is enlarged or reduced based on the image read scaling factor information. In addition, the image information can be read from the image memory based on the image reading start position information.

(11) The image position correcting method according to (9), wherein the image forming section correction information creating step is a step of creating image formation start position information used when the image information is drawn in the image forming section, image formation scaling factor information used when the image information is enlarged or reduced in an image memory, and paper transport speed information used when paper is transported in the image forming section.

In this feature, the image formation start position information used when the image information is drawn in the image forming section based on the image formation position error and the image formation scaling factor error, the image formation scaling factor information used when the image information is enlarged or reduced in the image memory, and the paper transport speed information used when paper is transported in the image forming section, are created and stored into the internal memory. Thereby, the image information supplied to the image forming section in an ordinary image forming task is read from the image memory based on the image formation start position information, where the image information is enlarged or reduced based on the image formation scaling factor information. In addition, paper is transported in the image forming section based on the paper transport speed information.

(12) An image position correcting method including:

a reference image forming step of forming a first reference image including an image which is used for measurement of an error in an image formation position and an error in an image formation scaling factor, on paper in an image forming section;

a first correction image reading step of reading an image of paper placed at an appropriate position on a first original platen after the formation of the first reference image, along with a second reference image including an image for use in measurement of an error in an image read position and an error in an image read scaling factor, the image being provided at an appropriate position on the first original platen, as a first image for correction, in an image reading section;

a second correction image reading step of reading an image of the paper transported via a second original platen after the formation of the first reference image, as a second image for correction, in a moving image reading section;

a fixed image reading section error measuring step of measuring an error in an image read position and an error in an image read scaling factor in the fixed image reading section based on the second reference image in the first correction image, in a control section;

an image forming section error measuring step of measuring an error in an image formation position and an error in an image formation scaling factor in the image forming section based on the image read position error and image read scaling factor error in the fixed image reading section and the first reference image in the first correction image, in the control section; and a moving image reading section error measuring step of measuring an error in an image read position and an error in an image read scaling factor in the moving image reading section based on the image formation position error and the image formation scaling factor error in the image forming section and the first reference image in the second correction image, in the control section.

In this feature, the first reference image including an image for use in measurement of an error in an image formation position and an error in an image formation scaling factor, which is formed on paper in the image forming section, and the second reference image including an image for use in measurement of an error in an image read position and an error in an image read scaling factor in the fixed image reading section, the image being provided at an appropriate position on the first original platen, are read as a first correction image, and are read as a second correction image in the moving image forming section. An error in the fixed image reading section is measured based on the second reference image in the first correction image. An error in the image forming section is measured based on an error in the fixed image reading section and the first reference image in the first correction image. An error in the moving image reading section is measured based on an error in the image forming section and the first reference image in the second correction image. Therefore, all of the error in the image forming section, the error in the fixed image reading section, and the error in the moving image forming section are measured only by performing the image forming task, the fixed original type image reading process, and the moving original type image reading process once for each.

(13) The image position correcting method according to (12), wherein:

the reference image forming step is a step of forming a top-side first reference image and a bottom-side first reference image on a top side and a bottom side of the paper, respectively;

the first correction image reading step is a step of reading an image of at least one of the top and bottom sides of the paper placed at an appropriate position on the first original platen, along with the second reference image, as the first correction image;

the second correction image reading step is a step of reading an image of each of the top and bottom sides of the paper as a top-side second correction image and a bottom-side second correction image, the paper being transported via the second original platen with the top and bottom sides thereof being reversed;

the moving image reading section error measuring step is a step of measuring an error in an image read position and an error in an image read scaling factor in the moving image reading section when a top-side image is read and when a bottom-side image is read, based on the image formation position error and the image formation scaling factor error in the image forming section and the top-side first reference image in the top-side second correction image and the bottom-side first reference image in the bottom-side second correction image.

In this feature, the top-side first reference image and the bottom-side first reference image formed on the top and bottom sides of paper in the image forming section, are read as the top-side second correction image and the bottom-side second correction image in the moving image forming section. Errors during top-side image reading and bottom-side image reading in the moving image reading section are measured based on an error in the image forming section, the top-side first reference image in the top-side second correction image, and the bottom-side first reference image in the bottom-side second correction image. Therefore, all of an error in the image forming section, an error in the fixed image reading section, an error during top-side image reading in the moving image forming section, and an error during bottom-side image reading in the moving image forming section, can be measured only by performing the image forming task, the fixed original type image reading process, and the moving original type image reading process once for each.

(14) The image position correcting method according to (12) or (13), wherein:

the image forming section error measuring step is a step of removing the error in the fixed image reading section measured in the fixed image reading section error measuring step from a result of comparison of the first reference image read by the fixed image reading section in the first correction image reading step with the first reference image information stored in an internal memory; and the moving image reading section error measuring step is a step of removing the error in the image forming section measured in the image forming section error measuring step from a result of comparison of the first reference image read by the moving image reading section in the second correction image reading step with the first reference image information stored in the internal memory.

In this feature, after the error in the fixed image reading section is removed from the result of comparison of the first reference image in the first correction image read by the fixed image reading section with the first reference image information in the memory, the error in the image forming section is removed from the result of comparison of the first reference image in the second correction image read by the moving image reading section with the first reference image information stored in the memory. Therefore, the influence of errors occurring in the fixed image reading section and the image forming section is removed from an error occurring in the first reference image read during transportation of paper on which the first reference image has been formed in the image forming section via the second original platen, so that an error occurring only in the moving image reading section is measured.

(15) The image position correcting method according to (12) or (13), further including, after at least the moving image reading section error measuring step, a moving image reading section correction information creating step of creating correction information for correcting image information read by the moving image reading section based on the image read position error and the image read scaling factor error in the moving image reading section, and storing the correction information into an internal memory.

In this feature, the correction information created based on the image read position error and the image read scaling factor error in the moving image reading section is stored into an internal memory. Therefore, it is not necessary to repeat measurement of an error and creation of correction information in an ordinary image reading task, and the read image information is accurately corrected using the correction information stored in the internal memory.

(16) The image position correcting method according to (15), wherein the moving image reading section correction information creating step is a step of creating transport start timing information for determining timing of starting transportation of an original with respect to the second original platen, and transport speed information for determining a transport speed of the original with respect to the second original platen In this feature, the transport start timing information for determining timing of starting transportation of an original with respect to the second original platen and transport speed information for determining a transport speed of an original with respect to the second original platen are created as information for correcting an error occurring in the moving image reading section. Therefore, the error occurring in the moving image reading section is corrected by changing contents of control of an original transport operation of the moving image reading section.

(17) An image position correcting instrument, wherein:

the image position correcting instrument is placed along with paper on which a first reference image including an image for use in measurement of an error in an image formation position and an error in an image formation scaling factor is formed, on an original platen, when an image position correcting task is performed in an image forming apparatus; and the image position correcting instrument has an elongate shape, having a width equal to a width in the subsidiary scanning direction of at least one image included in the first reference image and a length shorter than a length in the main scanning direction of the original platen of the image forming apparatus, a reference position with respect to the original platen of the image forming apparatus is inscribed on an upper surface of the image position correcting instrument, and a second reference image for use in measurement of an error in an image read position and an error in an image read scaling factor in an image position correcting task of the image forming apparatus is inscribed on a lower surface of the image position correcting instrument, and the image position correcting instrument includes a pressing member for pressing an original onto the upper surface of the original platen.

In this feature, a correction image reading task is performed while paper on which the first reference image is formed is placed at a predetermined position on the original platen via the image correction instrument on the bottom side of which the second reference image is formed. Therefore, the first reference image and the second reference image constituting a correction image are read from the paper placed at the predetermined position on the original platen and the image correction instrument. Thereby, it is possible to accurately perform an image position correcting task using the correction image.

(18) An image forming apparatus including an image reading section for reading image information of an original placed on an original platen, an image forming section for forming an output image based on the image information on paper, and a control section for controlling operations of the image reading section and the image forming section, wherein:

the image forming section forms an image on the paper, based on image information of a first reference image including an image for use in measurement of an error in an image formation position and an error in an image formation scaling factor, in an image position correcting task;

the image reading section reads an image of paper placed at an appropriate position on the original platen after an image is formed based on the image information of the first reference image, along with a second reference image including an image for use in measurement of an error in an image read position and an error in an image read scaling factor, the image being provided at an appropriate position on the original platen, as an image for correction, in the image position correcting task; and the control section performs, in the image position correcting task, an image reading section error measuring process of measuring the image read position error and the image read scaling factor error in the image reading section based on the second reference image in the correction image, an image forming section error measuring process of measuring the image formation position error and the image formation scaling factor error in the image forming section based on the measured image read position error and image read scaling factor error and the first reference image in the correction image, an image reading section correction information creating process of creating image reading section correction information for correcting image information read by the image reading section based on the image read position error and the image read scaling factor error, and storing the image reading section correction information into an internal memory, and an image forming section correction information creating process of creating image forming section correction information for correcting image information to be supplied to the image forming section, based on the image formation position error and the image formation scaling factor error, and storing the image forming section correction information into the internal memory.

In this feature, an image of paper on which the first reference image including an image for use in measurement of the image formation position error and the image formation scaling factor error in the image forming section, is read along with the second reference image including an image for use in measurement of the image read position error and the image read scaling factor error in the image reading section, the image being placed at an appropriate position on the original platen, as an image for correction. After an image in the image reading section is measured based on the second reference image in the correction image, an error in the image forming section is measured based on the error in the image reading section and the first reference image in the correction image. Therefore, both an error in the image forming section and an error in the image reading section are measured only by performing an image forming task once and an image reading task once.

In addition, the correction information for the image reading section created based on the image read position error and the image read scaling factor error, and the correction information for the image forming section created based on the image formation position error and the image formation scaling factor error are stored into the internal memory. Therefore, in an ordinary image reading task and an ordinary image forming task, measurement of an error and creation of correction information are not repeated, and image information is corrected based on the correction information stored in the internal memory.

(19) The image forming apparatus according to (18), wherein, when outputting image information read by the image reading section in an image reading task other than in the image position correcting task to an external apparatus, the control section corrects an image position and an image scaling factor of the image information measured by the image reading section using the image reading section correction information stored in the internal memory.

In this feature, the image information read by the image reading section in an ordinary image reading task is output to an external apparatus, where the image position and the image scaling factor are corrected based on the image reading section correction information stored in the internal memory. Therefore, when the image forming apparatus is used as a scanner, image information for which an error occurring in an image reading task is corrected is supplied to an external apparatus, such as a printer or the like.

(20) The image forming apparatus according to (18), wherein, when forming an image on paper in the image forming section based on image information input from an external apparatus other than in the image position correcting task, the control section corrects an image position and an image scaling factor of the image information input from an external apparatus based on the image forming section correction information stored in the internal memory.

In this feature, image information input from an external apparatus in an ordinary image forming task, which is corrected based on the image forming section correction information stored in the internal memory, is supplied to the image forming section. Therefore, when the image forming apparatus is used as a printer, image information for which an error occurring in an image forming task is previously corrected is supplied to the image forming section.

(21) The image forming apparatus according to (18), wherein, when an image is formed on paper in the image forming section based on image information read by the image reading section in an image reading task other than in the image position correcting task, the control section corrects an image position and an image scaling factor of the image information read by the image reading section using the image reading section correction information and the image forming section correction information stored in the internal memory.

In this feature, image information is read by the image reading section in an ordinary image reading task. After an image position and an image scaling factor are corrected based on the image reading section correction information stored in the internal memory, the image information is stored into an image memory. Thereafter, the image information is corrected based on image forming section correction information stored in the internal memory. The resultant image information is supplied to the image forming section in an ordinary image forming task. Therefore, when the image forming apparatus is used as a copier, image information is supplied to the image forming section after an error occurring in an image reading task and an error occurring in an image forming task are corrected.

(22) An image forming apparatus including a fixed image reading section for reading image information of an original placed on a first original platen, a moving image reading section for reading image information of the original transported via a second original platen, an image forming section for forming an output image based on the image information on paper, and a control section for controlling operations of the fixed image reading section, the moving image reading section, and the image forming section, wherein:

the image forming section forms an image on the paper, based on image information of a first reference image including an image for use in measurement of an error in an image formation position and an error in an image formation scaling factor, in an image position correcting task;

the fixed image reading section reads an image of the paper placed at an appropriate position on the first original platen after an image is formed based on the image information of the first reference image, along with a second reference image including an image for use in measurement of an error in an image read position and an error in an image read scaling factor, the image being provided at an appropriate position on the first original platen, as a first image for correction, in the image position correcting task;

the moving image reading section reads an image of the paper transported via the second original platen after an image is formed based on the image information of the first reference image, in the image position correcting task;

the control section performs, in the image position correcting task, a fixed image reading section error measuring process of measuring the image read position error and the image read scaling factor error in the fixed image reading section based on the second reference image in the first correction image, an image forming section error measuring process of measuring the image formation position error and the image formation scaling factor error in the image forming section based on a result of measurement of the image read position error and the image read scaling factor error in the fixed image reading section and the first reference image in the first correction image, a moving image reading section error measuring process of measuring the image read position error and the image read scaling factor error in the moving image reading section based on a result of measurement of the image formation position error and the image formation scaling factor error in the image forming section and the first reference image in the second correction image, a fixed image reading section correction information creating process of creating fixed image reading section correction information for correcting an error occurring in the fixed image reading section based on the error measured in the fixed image reading section error measuring process, and storing the fixed image reading section correction information into an internal memory, an image forming section correction information creating process of creating image forming section correction information for correcting an error occurring in the image forming section, based on the error measured in the image forming section error measuring process, and storing the image forming section correction information into the internal memory, and a moving image reading section correction information creating process of creating moving image reading section correction information for correcting an error occurring in the moving image reading section based on the error measured in the moving image reading section error measuring process, and storing the moving image reading section correction information into the internal memory.

In this feature, the first reference image including an image for use in measurement of an error in an image formation position and an error in an image formation scaling factor, which is formed on paper in the image forming section, and the second reference image including an image for use in measurement of an error in an image read position and an error in an image read scaling factor in the fixed image reading section, the image being provided at an appropriate position on the first original platen, are read as a first correction image, and are read as a second correction image in the moving image forming section. An error in the fixed image reading section is measured based on the second reference image in the first correction image. An error in the image forming section is measured based on an error in the fixed image reading section and the first reference image in the first correction image. An error in the moving image reading section is measured based on an error in the image forming section and the first reference image in the second correction image. Therefore, all of the error in the image forming section, the error in the fixed image reading section, and the error in the moving image forming section are measured only by performing the image forming task, the fixed original type image reading process, and the moving original type image reading process once for each.

In addition, the correction information for the moving image reading section created based on the image read position error and the image read scaling factor error in the moving image reading section is stored into the internal memory. Therefore, in an ordinary image reading task, measurement of an error and creation of correction information do not need to be repeated, and read image information is corrected based on the correction information stored in the internal memory.

(23) The image forming apparatus according to (22), wherein:

the moving image reading section has a function to read images on both sides of an original, wherein the top and bottom sides of the original are successively transported via the second original platen;

the reference image forming process is a process of forming the top-side first reference image and the bottom-side first reference image on the top and bottom sides of the paper, respectively;

the first correction image reading process is a process of reading an image of at least one of the top and bottom sides of the paper placed at an appropriate position on the first original platen, along with the second reference image, as the first correction image;

the second correction image reading process is a process of reading images of the top and bottom sides of the paper, the paper being transported via the second original platen with the top and bottom sides thereof being reversed, as a top-side second correction image and a bottom-side second correction image, respectively; and the moving image reading section error measuring process is a process of measuring an error in an image read position and an error in an image read scaling factor in top-side image reading and bottom-side image reading in the moving image reading section, based on the image formation position error and the image formation scaling factor error in the image forming section, the top-side first reference image in the top-side second correction image, and the bottom-side first reference image in the bottom-side second correction image.

In this feature, the top-side first reference image and the bottom-side first reference image formed on the top and bottom sides of paper, respectively, in the image forming section, are read as a top-side second correction image and a bottom-side second correction image in the moving image forming section. Errors in top side reading and bottom side reading in the moving image reading section are measured based on the error in the image forming section, the top-side first reference image in the top-side second correction image, and the bottom-side first reference image in the bottom-side second correction image. Therefore, all of the error in the image forming section, the error in the fixed image reading section, and the errors in top side reading and bottom side reading in the moving image forming section are measured only by performing the image forming task, the fixed original type image reading process, and the moving original type image reading process once for each.

BRIEF DESCRIPTION OF THE DRAWINGS

FIG. 3 is a diagram illustrating a first reference image for use in the image position correcting task of the image forming apparatus.

FIG. 16 is a plan view illustrating a state in which paper (two-sided reference original) is fixed on an original platen in an image position correcting task of the image forming apparatus.

BEST MODE FOR CARRYING OUT THE INVENTION

Figure 1:
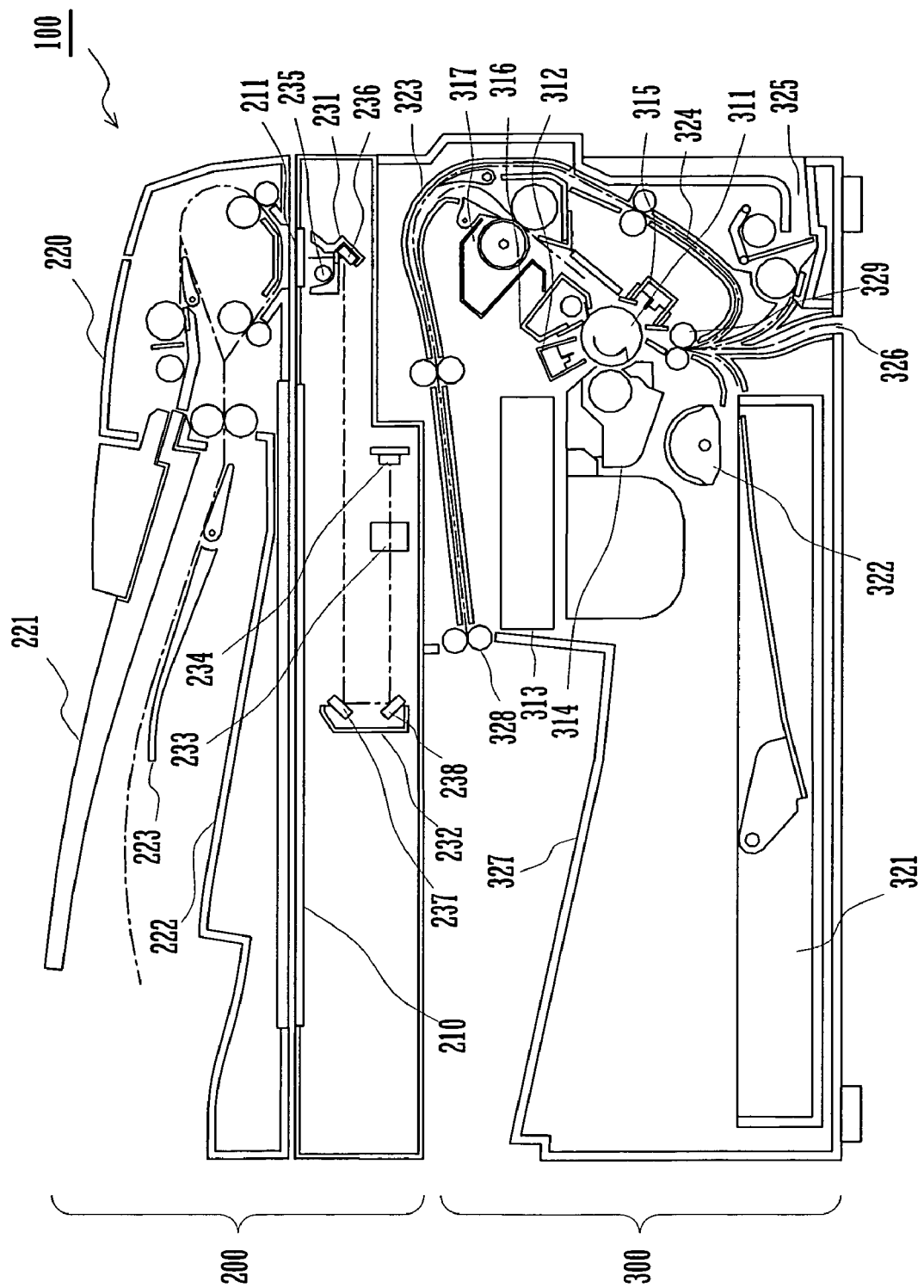
FIG. 1 is a diagram illustrating a structure of an image forming apparatus to which an image position correcting method according to an embodiment of the present invention is applied.

FIG. 1 is a diagram illustrating a structure of an image forming apparatus to which an image position correcting method according to an embodiment of the present invention is applied. The image forming apparatus 100 is roughly divided in to an image reading section 200 (upper portion) and an image forming section 300 (lower portion). The image reading section 200 has a first original platen 210 and a second original platen 211 which are made of transparent glass. An auto document feeder (hereinafter referred to as an ADF) 220 is provided over the original platens 210 and 211. The original platens 210 and 211 are covered with the ADF 220, which can be freely opened to expose upper sides of the original platens 210 and 211.

The ADF 220 selectively performs a one-sided read mode process or a two-sided read mode process. In the one-sided read mode process, the ADF 220 guides one or a plurality of originals placed on an original tray 221 on a sheet-by-sheet basis via the original platen 211 to an eject tray 222. In the two-sided read mode process, the ADF 220 guides one or a plurality of originals placed on the original tray 221 on a sheet-by-sheet basis via the original platen 211 to an intermediate tray 223, and reverses the front and rear of an original transport direction of the original in the intermediate tray 223 to reverse the upper and lower sides of the original, and guides the resultant original via the original platen 211 again to the eject tray 222.

In the image reading section 200, a first mirror base 231, a second mirror base 232, a lens 233, and a photoelectric transducer (hereinafter referred to as a CCD) 234 are provided below the original platens 210 and 211. The first mirror base 231 has a lamp unit 235 and a first mirror 236, and can be freely reciprocated in a horizontal direction below the original platens 210 and 211. The second mirror base 232 has a second mirror 237 and a third mirror 238, and can be freely reciprocated in a horizontal direction below the original platens 210 and 211.

Mirrors 236 to 238 guide reflected light which is light of the lamp unit 235 reflected on the image side of an original, to the lens 233. The lens 233 focuses the reflected light provided via the mirrors 236 to 238 to form an image on a light receiving surface of the CCD 234. The CCD 234 outputs an electrical signal, depending on the amount of light received on the light receiving surface.

In the fixed original type image reading process, in which an image on an original placed on the first original platen 210 is read, when a start key provided on an operation section (not shown) is operated, an image side of an original on the original platen 210 is irradiated with light of the lamp unit 235, while the first mirror base 231 is moved at a predetermined speed in a direction indicated by arrow A, and the second mirror base 232 is moved at half the speed of the first mirror base 231 in the direction indicated by arrow A. Thereby, light of the lamp unit 231 reflected on the image side of the original is received by the CCD 234 via the mirrors 236 to 238 and the lens 233 with the light path length being constant with respect to the entire image side of the original placed on the first original platen 210. Therefore, the first original platen 210, the first mirror base 231, the second mirror base 232, the lens 233, and the CCD 234 are used to perform the fixed original type image reading process. The first original platen 210, the first mirror base 231, the second mirror base 232, the lens 233, and the CCD 234 constitute a fixed image reading section.

In the moving original type image reading process, in which an image on an original which is set on the original tray 221 of the ADF 220 is read, when the start key of the operation section is operated, the first mirror base 231 is shifted to a position at which the first mirror base 231 faces the second original platen 211. Also, the second mirror base 232 is shifted to a position at which the length of an light path from the image side of the original which passes on the upper side of the second original platen 211, via the mirrors 236 to 238 and the lens 233, to the light receiving surface of the CCD 234 is equal to the light path length of the fixed original type image reading process. Thereby, light of the lamp unit 231 reflected on the image side of the original is received by the CCD 234 via the mirrors 236 to 238 and the lens 233 with the light path length being constant with respect to the entire image side of the original passing over the second original platen 211. Therefore, the ADF 220, the second original platen 211, the first mirror base 231, the second mirror base 232, the lens 233, and the CCD 234 are used to perform the moving original type image reading process. Among them, the ADF 220 and the second original platen 211 constitute a moving image reading section.

The image forming section 300 includes a charger 312, a developer 314, a transferrer 315, a cleaner 316, and the like, which are provided around a photoreceptor drum 311 rotatably supported in a direction indicated by arrow C and in this order along a rotational direction of the photoreceptor drum 311. The image forming section 300 also includes an exposure unit 313 of exposing a surface of the photoreceptor drum 311 with image light between the exposure unit and the developer 314, which is located downstream of the charger 312 in the rotational direction of the photoreceptor drum 311.

An electrical signal output from the CCD 234 of the image reading section 200 is converted into digital data, the digital data is subjected to a predetermined image process, and the resultant image data is supplied to the exposure unit 313. Also, image data input from an external apparatus to the image forming apparatus 100 is developed into bitmap data, the bitmap data is subjected to a predetermined image process, and the resultant image data is supplied to the exposure unit 313.

A paper feed cassette 321 is detachably attached to a lowest portion of the image forming section 300. The paper feed cassette 321 holds a predetermined number of sheets of paper. The paper held in the paper feed cassette 321 is fed on a sheet-by-sheet basis by rotation of a paper feed roller 322. In the image forming section 300, a paper transport path 323 from the paper feed cassette 321 via between the photoreceptor drum 311 and the transferrer 315 to a paper output tray 327, is formed. Within the paper transport path 323, a plurality of rollers including a resistration roller 329, the paper feed roller 322, and a paper output roller 328, and a fixing device 317 are provided. Also in the image forming section 300, a reversing transport path 324 is formed. The reversing transport path 324 links a portion downstream from the fixing device 317 of the paper transport path 323, into between the paper feed roller 322 and the resistration roller 329.

In the image forming process of the image forming section 300, an electrophotographic image forming process including a charging step, an exposing step, a developing step, a transferring step, and a fixing step, is performed based on image data. Specifically, unipolar charge is uniformly provided by the charger 312 to a surface of the photoreceptor drum 311 rotating in a direction indicated by arrow C (charging step), and thereafter, the surface of the photoreceptor drum 311 is exposed with image light of the exposure unit 313 which is modulated based on image data (exposing step). Thereby, an electrostatic latent image is formed on the surface of the photoreceptor drum 311. The electrostatic latent image on the surface of the photoreceptor drum 311 is developed to a toner image using a toner supplied from the developer 314 (developing step).

Paper fed from the paper feed cassette 321 is guided by the registration roller 329 into between the photoreceptor drum 311 and the transferrer 315 with timing which allows a leading edge portion of the paper to face a leading edge of the toner image formed on the surface of the photoreceptor drum 311. The toner image on the surface of the photoreceptor drum 311 is transferred onto the paper by the transferrer 315

(transferring step), and thereafter, is heated and pressed by the fixing device 317 to be securely fixed on the paper (fixing step).

Note that, after end of the transferring step, residual toner including paper powder is removed from the surface of the photo receptor drum 311 using the cleaner 316, and thereafter, the surface of the photoreceptor drum 311 is used again for the above-described image forming process.

Figure 12:
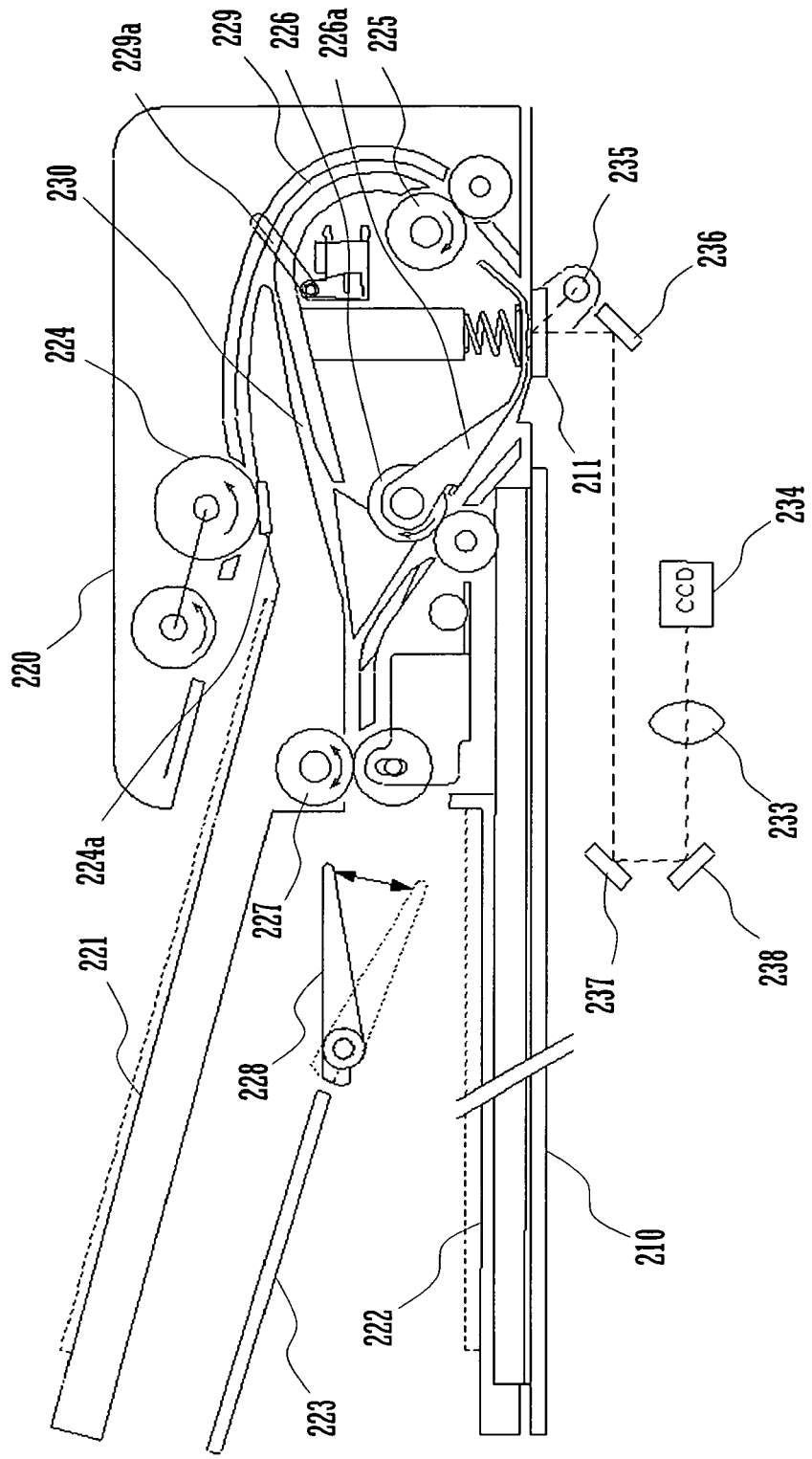
FIG. 12 is a diagram illustrating a structure of an ADF for use in the image forming apparatus.
Figure 13:
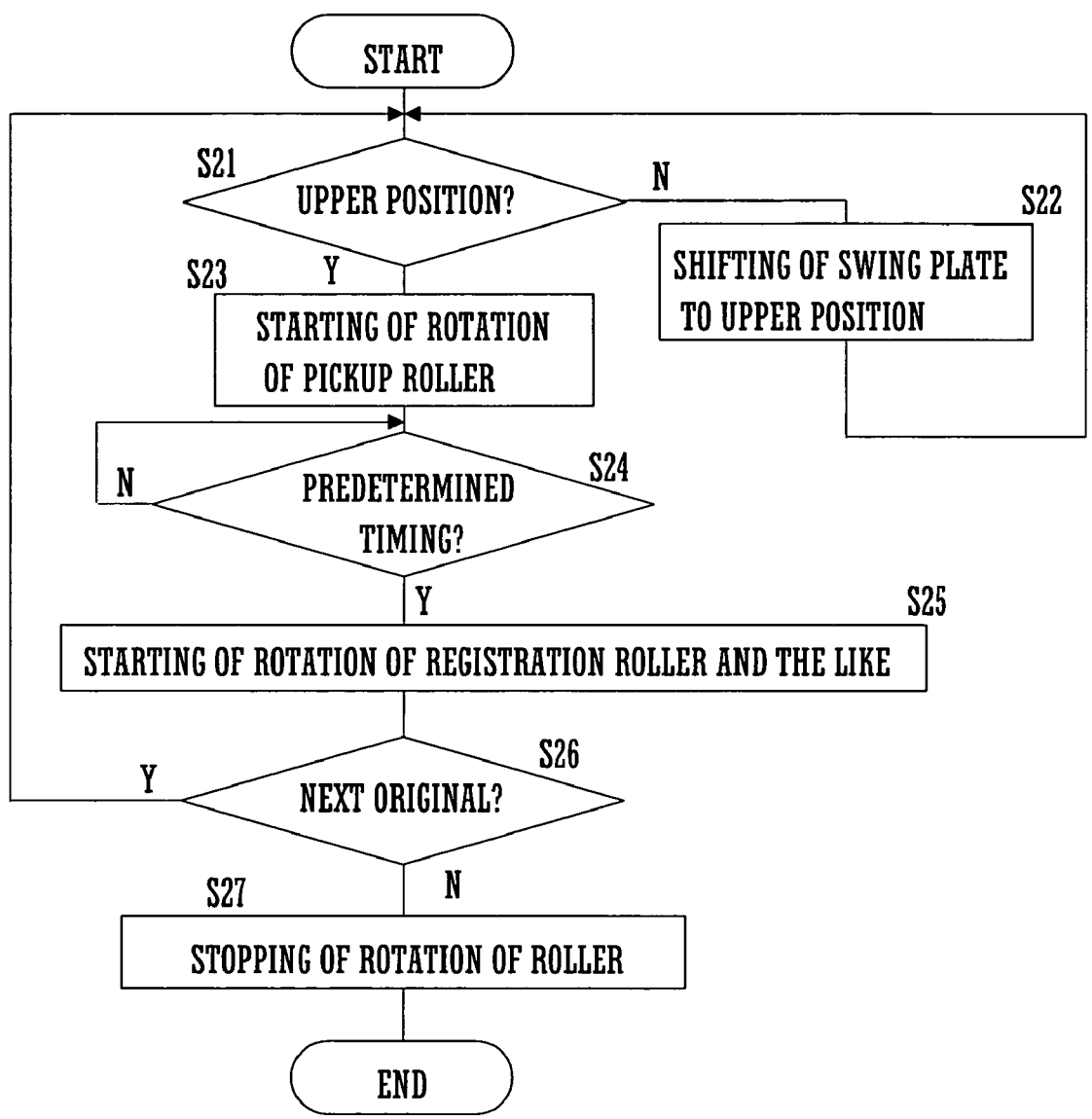
FIG. 13 is a flowchart for explaining an operation of the ADF for a one-sided original in a moving image reading process.
Figure 14:
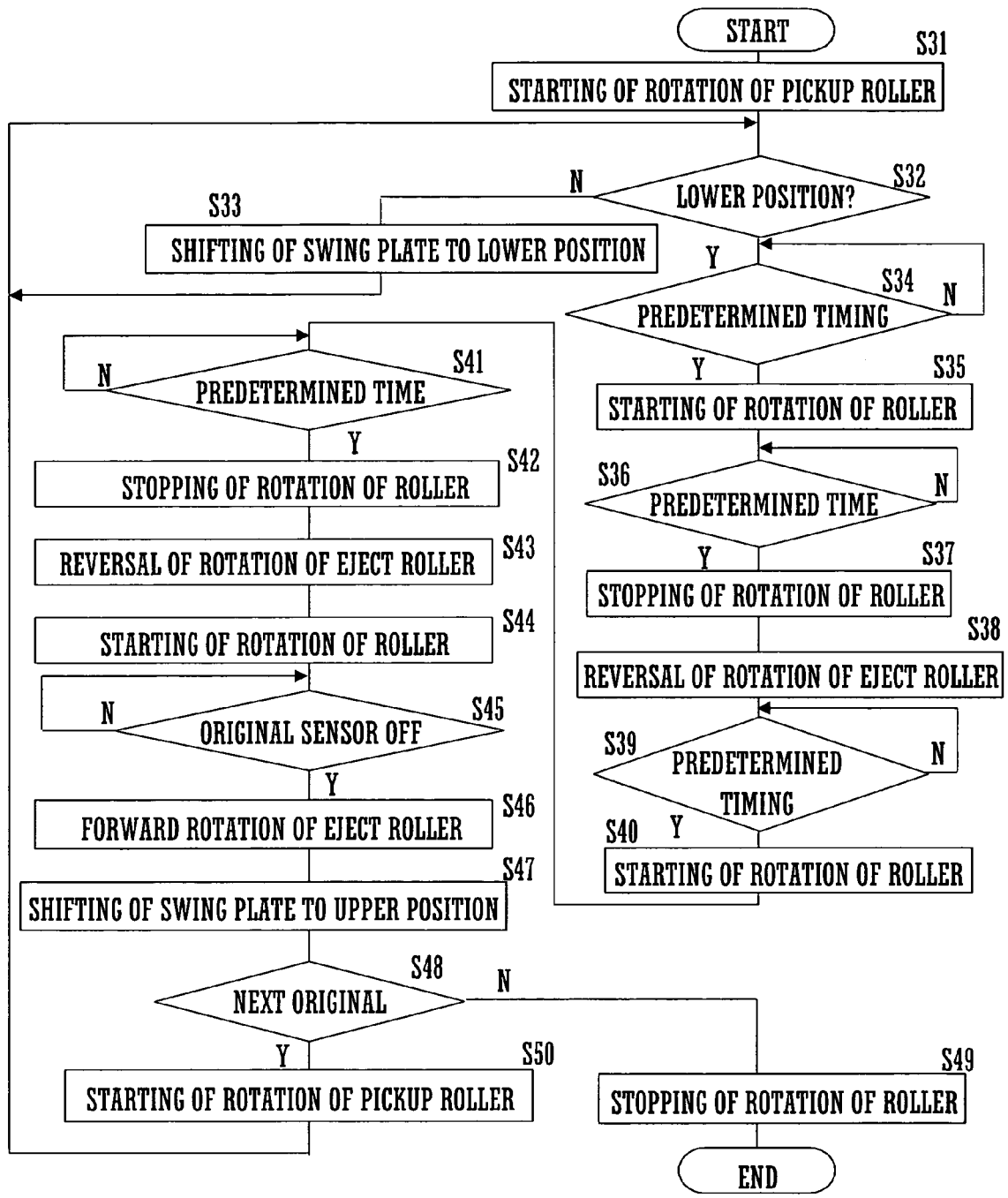
FIG. 14 is a flowchart for explaining an operation of the ADF for a two-sided original in a moving image reading process.

FIG. 12 is a diagram illustrating a structure of an ADF for use in the image forming apparatus. FIGS. 13 and 14 are flowcharts for explaining an operation of the image forming apparatus in the moving image reading process. In the ADF 220, an original transport path 229 having a pickup roller 224, a resistration roller 225, a transport roller 226, an eject roller 227, a swing plate 228, and the like, is formed from an original tray 221 via between a second original platen 211 and an original pressing plate 226a to an intermediate tray 223 and an eject tray 222.

In the moving image reading process (the moving original type image reading process) performed by an operation of the ADF 220, a light source 235 and a mirror 236 are shifted to a position at which the light source 235 and the mirror 236 faces a lower side of the second original platen 211. An original which is passed through between the second original platen 211 and the original pressing plate 226a on the original transport path 229 by the resistration roller 225 and the transport roller 226, is irradiated with light from the light source 235, and the reflected light is received by the CCD 234 via the mirrors 236 to 238 and the lens 233, so that an image is read. The swing plate 228 provided external to the eject roller 227 selectively guides an original output by the eject roller 227 onto the intermediate tray 223 or the eject tray 222.

In the one-sided read mode process in which only one side of an original is read, the ADF 220 shifts the swing plate 228 to an upper position indicated with a solid line in FIG. 12 to open in the direction of the eject tray 222 (S21 and S22), and in this state, starts rotation of the pickup roller 224 (S23) as illustrated in FIG. 13. Thereby, an original placed on the original tray 221 is sent out on a sheet-by-sheet basis onto the original transport path 229 by the pickup roller 224 and a separation plate 224a. The original thus sent out is transported on the original transport path 229 and is temporarily stopped with a leading end of the original abutting the resistration roller 225 which is not rotating.

The ADF 220 starts rotation of the resistration roller 225, the transport roller 226, and the eject roller 227 with predetermined timing (S24 and S25), so that the leading edge portion of the original which has been stopped in the original transport path 229 faces the upper side of the second original platen 211 at the start of an original read process. The original which has been passed through the upper side of the second original platen 211, is transported toward the eject roller 227 by rotation of the transport roller 226. After an image on one side of the original is read at a position at which the original faces the upper side of the second original platen 211, the original is ejected onto the eject tray 222 by rotation of the eject roller 227. The ADF 220 repeatedly performs steps S21 to S26 for all originals placed on the original tray 221 in the moving original type and one-sided read mode process (S26→S21), and when no original remains on the original tray 221, stops rotation of all the rollers to end the process (S27).

On the other hand, in the two-sided read mode process in which images on both sides of an original are read, the ADF 220 first starts rotation of the pickup roller 224 (S31) to send out an uppermost original of the originals placed on the original tray 221 onto the original transport path 229. The original thus sent out is temporarily stopped with a leading end of the original abutting the resistration roller 225. Thereafter, the ADF 220 shifts the swing plate 228 to a lower position indicated with a dashed line in FIG. 12 so as to open in the direction of the intermediate tray 223 (S32 and S33) as illustrated in FIG. 14.

The ADF 220 starts rotation of the resistration roller 225, the transport roller 226, and the eject roller 227 with predetermined timing (S34 and S35), so that the leading edge portion of the original which has been stopped in the original transport path 229 faces the upper side of the second original platen 211 at the start of an original read process. An image on a first side of the original is read at a position at which the original faces the upper side of the second original platen 211. Thereafter, the original is transported toward the eject roller 227 by rotation of the transport roller 226, and thereafter, is guided onto the intermediate tray 223 by rotation of the eject roller 227.

The ADF 220 temporarily stops all the rollers including the eject roller 227 with predetermined timing, i.e., when a predetermined time has elapsed since the start of rotation of the resistration roller 225 in S35 and before a tailing edge of the original passes through the eject roller 227 (S36 and S37). Thereafter, the ADF 220 reverses the rotational direction of the eject roller 227 (S38), and guides the original whose leading edge and tailing edge are reversed, via a subsidiary original transport path 230 onto the original transport path 229. The original the image on the first side of which has been read is temporarily stopped with the leading edge (after reversing) thereof abutting the resistration roller 225.

Next, the ADF 220 starts rotation of the resistration roller 225, the transport roller 226, and the eject roller 227 with predetermined timing (S39 and S40), and guides the original the image on the first side of which has been read into between the second original platen 211 and the original pressing plate 226a. In this case, since a second side of the original faces the second original platen 211, an image on the second side of the original is read while the original is passed through between the second original platen 211 and the original pressing plate 226a. The original the images on both sides of which have been read is transported toward the eject roller 227 by rotation of the transport roller 226, and thereafter, is guided onto the intermediate tray 223 by rotation of the eject roller 227.

The ADF 220 temporarily stops all the rollers including the eject roller 227 with predetermined timing, i.e., when a predetermined time has elapsed since the start of rotation of the resistration roller 225 in S40 and before the tailing edge of the original passes through the eject roller 227 (S41 and S42). Thereafter, the ADF 220 reverses the rotational direction of the eject roller 227 (S43), and starts rotation of the resistration roller 225 and the transport roller 226 (S44).

Also, the ADF 220 rotates the eject roller 227 in a forward direction after an original sensor 229a detects passage of the tailing end of the original, and thereafter, shifts the swing plate 228 to the upper position to open in the direction of the eject tray 222 (S45 to S47). Thereby, the original the images on both sides of which have been read is ejected onto the eject tray 222. Thereafter, the ADF 220 determines the presence or absence of an original on the original tray 221 (S48). When no original remains on the original tray 221, the rotation of all the rollers is stopped and the process is ended after an original(s) which are currently being transported is ejected onto the eject tray 222 (S49). When the next original remains, the ADF 220 starts rotation of the pickup roller 224 and goes to S32 (S50).

As described above, in the two-sided read mode process, the ADF 220 includes the first-side read transport step for reading an image on the first side and the second-side read transport step for reading an image on the second side. In addition, the ADF 220 performs a no read transport step of transporting an original without reading an image thereon. Thereby, a plurality of originals the images of both sides of which have been read are ejected and stacked on the eject tray 222 in the same order as that in which the originals were set on the original tray 221.

As described above, in the moving image reading process, an image is read from an original transported on the original transport path 229 of the ADF 220. Therefore, image reading start positions in a main scanning direction and a subsidiary scanning direction vary depending on timing of starting rotation of the resistration roller 225 and a transfer speed of an original, and an image read scaling factor in the subsidiary scanning direction varies depending on the original transfer speed.

Figure 7:
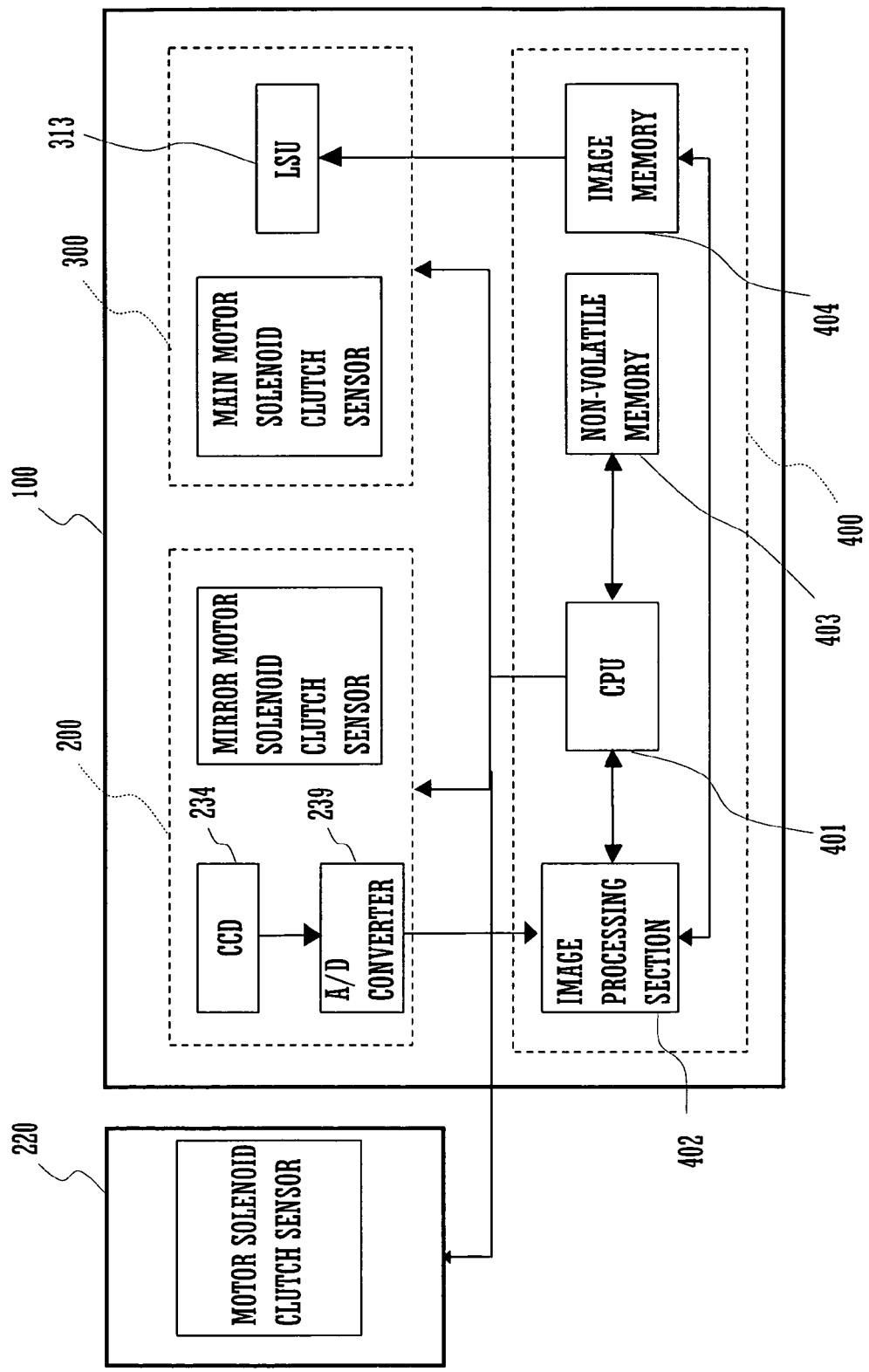
FIG. 7 is a block diagram including a control section of the image forming apparatus.

FIG. 7 is a block diagram including a control section of the image forming apparatus. The image forming apparatus 100 includes the control section 400 for controlling the image reading section 200 and the image forming section 300. The control section 400 includes a CPU 401, an image processing section 402, a non-volatile memory 403, and an image memory 404. The CPU 401 drives and controls the image reading section 200, the ADF 220, and the image forming section 300 in accordance with a program previously stored in a ROM (not shown). The non-volatile memory 403 is composed of an EEPROM or the like, and stores error information calculated during an image position correcting task or the like. The image memory 404 is composed of an SDRAM or the like, and stores image data.

The image processing section 402 is composed of, for example, an ASIC. The image processing section 402 receives image data which is obtained by converting an output signal from the CCD 234 of the image reading section 200 into digital data using an A/D converter 239. The image processing section 402 also receives print data or fax data as image data from an external apparatus (not shown). The image processing section 402 performs a predetermined image process, such as an edge emphasizing process or the like, with respect to the received image data.

Figure 2:
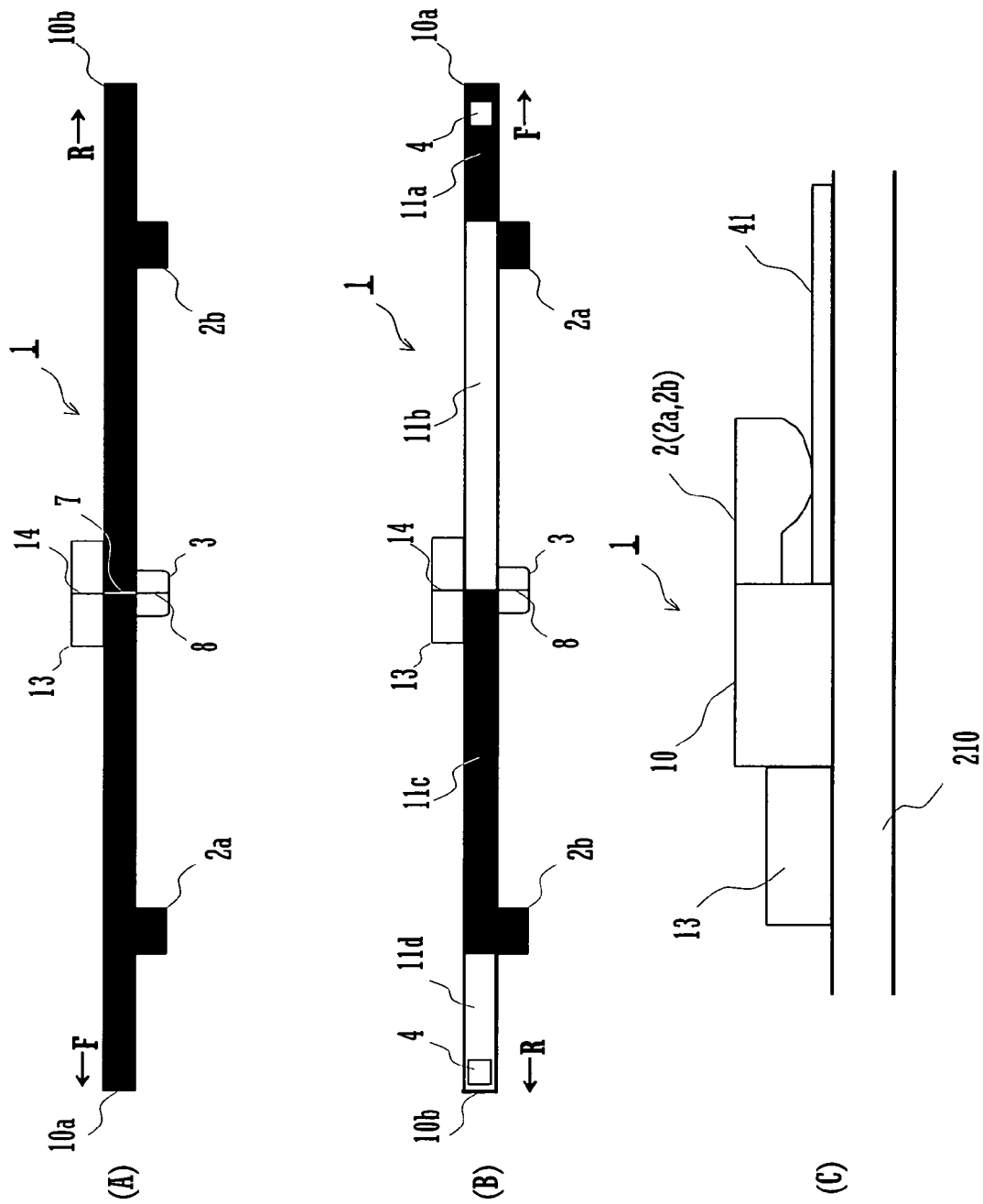
FIG. 2 is a top view, a bottom view, and a side view (in use) of a correction instrument which is used in a task of correcting an image position in the image forming apparatus.

FIG. 2 illustrates a top view, a bottom view, and a side view (in use) of a correction instrument which is used in a task of correcting an image position and an image scaling factor in the image forming apparatus (hereinafter referred to as an image position correcting task). A correction instrument 1 is an image position correction instrument according to the present invention. The correction instrument 1 includes an elongate main body 10, a paper pressing portion 2 (2a and 2b), a reference member 3, a guide member 13, and a slip preventing portion 4. The paper pressing portion 2 (2a and 2b) and the reference member 3 are projected from one side surface of the main body 10. The guide member 13 is projected from the other side surface of the main body 10. The slip preventing portion 4 is provided on a bottom surface and opposite edge portions in a length direction of the main body 10.

Concerning the main body 10, at least the bottom surface thereof is a plane, and the two side surfaces thereof are planes in parallel to each other. In this example, as illustrated in FIG. 2(C), the main body 10 has a rectangular cross section. The reference member 3 and the guide member 13 are made of a transparent or translucent material and are in the shape of a flat plate, and are projected from a middle portion in the length direction of the main body 10. The paper pressing portions 2a and 2b are projected from two respective portions in the length direction of the main body 10. As illustrated in FIG. 2(C), the paper pressing portions 2a and 2b press an original 5 placed on the original platen 210 from the top to fix its position on the original platen 210. The slip preventing portion 4 prevents slip of the correction instrument 1 on the upper side of the original platen 210.

As illustrated in FIG. 2(A), an indicator 7 indicating a center position in the length direction of the main body 10 is inscribed on the upper surface of the main body 10. In other words, a distance in the length direction of the main body 10 from the indicator 7 to one edge portion (front edge portion) 10a (a front portion of the image forming apparatus 100) is equal to a distance in the length direction of the main body 10 from the indicator 7 to the other edge portion (rear edge portion) 10b (a rear portion of the image forming apparatus 100). The indicator 7 is composed of a straight line perpendicular to the length direction of the main body 10. An indicator 8 contiguous in the subsidiary scanning direction with the indicator 7 is inscribed on the upper surface of the reference member 3. Also, an indicator 14 contiguous in the subsidiary scanning direction with the indicator 7 is inscribed on the upper surface of the guide member 13.

As illustrated in FIG. 2(B), the bottom surface of the main body 10 has a second black portion 11a, a first white portion 11b, a first black portion 11c, and a second white portion 11d in this order from the front edge portion 10a to the rear edge portion 10b. A boundary between the first white portion 11b and the first black portion 11c coincides with the indicators 7 and 8 on the top surfaces of the main body 10 and the reference member 3 in the length direction of the main body 10. A boundary between the first white portion 11b and the second black portion 11a substantially coincides with a front side surface of the front paper pressing portion 2a. A boundary between the first black portion 11c and the second white portion 11d substantially coincides with a rear side surface of the rear paper pressing portion 2b. The second black portion 11a, the first white portion 11b, the first black portion 11c, and the second white portion 11d are read as a reference image 33 (a second reference image of the present invention).

Concerning the length direction of the main body 10, the first black portion 11c and the first white portion 11b have the same length, and the second black portion 11a and the second white portion 11d have the same length. As an example, the first black portion 11c and the first white portion 11b each have a length of 95 mm in the length direction of the main body 10. The main body 10 has a width of 10 mm and an entire length of 250 mm. Therefore, the second black portion 11a and the second white portion 11d each have a length of 30 mm.

As illustrated in FIG. 2(C), the correction instrument 1 is provided on the first original platen 210 of the image forming apparatus 100. In the image position correcting task, the length direction of the correction instrument 1 is parallel to the main scanning direction which is the forward or backward direction of the image forming apparatus 100. In this case, the indicator 7 of the correction instrument 1 coincides with a center line 13' of an original reference plate 13 provided on the first original platen 210, in the main scanning direction (a length direction of the correction instrument (a direction X in FIG. 5)).

Note that the sum of the length of the first black portion 11c and the length of the first white portion 11b (in this example, 190 mm) is assumed to be a reference length in the main scanning direction in the image position correcting task. A width of the main body 10 which is a width of the first black portion 11c and the first white portion 11b (in this example, 10 mm) is assumed to be a reference length in the subsidiary scanning direction (a direction perpendicular to the main scanning direction (a direction Y in FIG. 5)) in the image position correcting task.

In the image position correcting task, when an original placed on the first original platen 210 is pressed by the paper pressing portion 2 of the correction instrument 1 to be fixed at a position on the first original platen 210, the entirety of one of an edge surface 5a of an original and a side surface 10c closer to the original of the main body 10 of the correction instrument 1 abuts the other in the main scanning direction as illustrated in FIG. 2(C). Also, a center in the main scanning direction of the original 5 is caused to coincide with the center line 7 of the correction instrument 1.

FIG. 3 is a diagram illustrating a first reference image for use in the image position correcting task of the image forming apparatus. FIG. 3(A) is a diagram illustrating paper on which a one-sided first reference image is formed. FIG. 3(B) is a diagram illustrating paper on which a both side first reference image is formed. FIG. 3(C) is a diagram illustrating a state where the paper of FIG. 3(A) is used in the image position correcting task.

The one-sided first reference image 31 is formed on one side of paper 41, while the other side of the paper 41 is blank. A top-side first reference image 32a and a bottom-side first reference image 32b (a both side first reference image 32) are formed on the respective sides of paper 42. In this example, the top-side first reference image 32a and the bottom-side first reference image 32b are reverse to each other in a vertical direction on the top and bottom sides of the paper 42. The first reference images 31 and 32 are formed on the paper 41 and 42, respectively, in the image forming section 300 of the image forming apparatus 100. Particularly, the both-side first reference image 32 is formed on both sides of the paper 42 using a both-side image forming function of the image forming section 300.

In this embodiment, a length direction 6f the paper 41 and 42, on which the first reference images 31 and 32 are respectively formed, is caused to coincide with the subsidiary scanning direction (a paper transport direction) of the image forming apparatus 100. The paper 41 and 42 have a size of, for example, A4. The present invention is not limited to this. The first reference images 31 and 32 are previously stored in a non-volatile memory (described below) of the image forming apparatus 100. Note that the first reference images 31 and 32 can be stored in an external apparatus (e.g., a computer, etc.) connected to the image forming apparatus 100.

The first reference images 31 and 32 include two black band-like images 311 and 312 formed on upper and lower edge portions of the paper 41 and 42, and a black triangular image 313 formed below and close to the upper band-like image 311. The band-like images 311 and 312 are each in the shape of, for example, a rectangle of 190 mm×10 mm, and the paper 41 and 42 have the same position in a width direction thereof. The triangular images 313 are located at the same position in the width direction of the paper 41 and 42, and the upper vertex of the triangular image 313 coincides with the center position of the band-like images 311 and 312. The vertex is previously stored so that the first reference image 31 is located at a center in the width direction of the paper 41 and 42 when the first reference image 31 is formed at an appropriate image position on the paper 41 and 42 with an appropriate image scaling factor. Note that, in addition to the band-like images 311 and 312 and the triangular image 313, characters "SIDE A" and "SIDE B" or the like indicating the top and bottom sides, respectively, are drawn on the top-side first reference image 32a and the bottom-side first reference image 32b, respectively, of the both-side first reference image 32.

When the paper 41 and 42 (reference originals) and the correction instrument 1 are placed on the first original platen 210 and are used in the image position correcting task of the image forming apparatus 100, an upper portion of the paper 41 and 42 (reference originals) is folded into two halves in the width direction so that both edge portions thereof parallel to each other in the length direction are attached together, thereby forming a crease (hereinafter referred to as a broken line) 51, as illustrated in FIG. 3(C).

Figure 4:
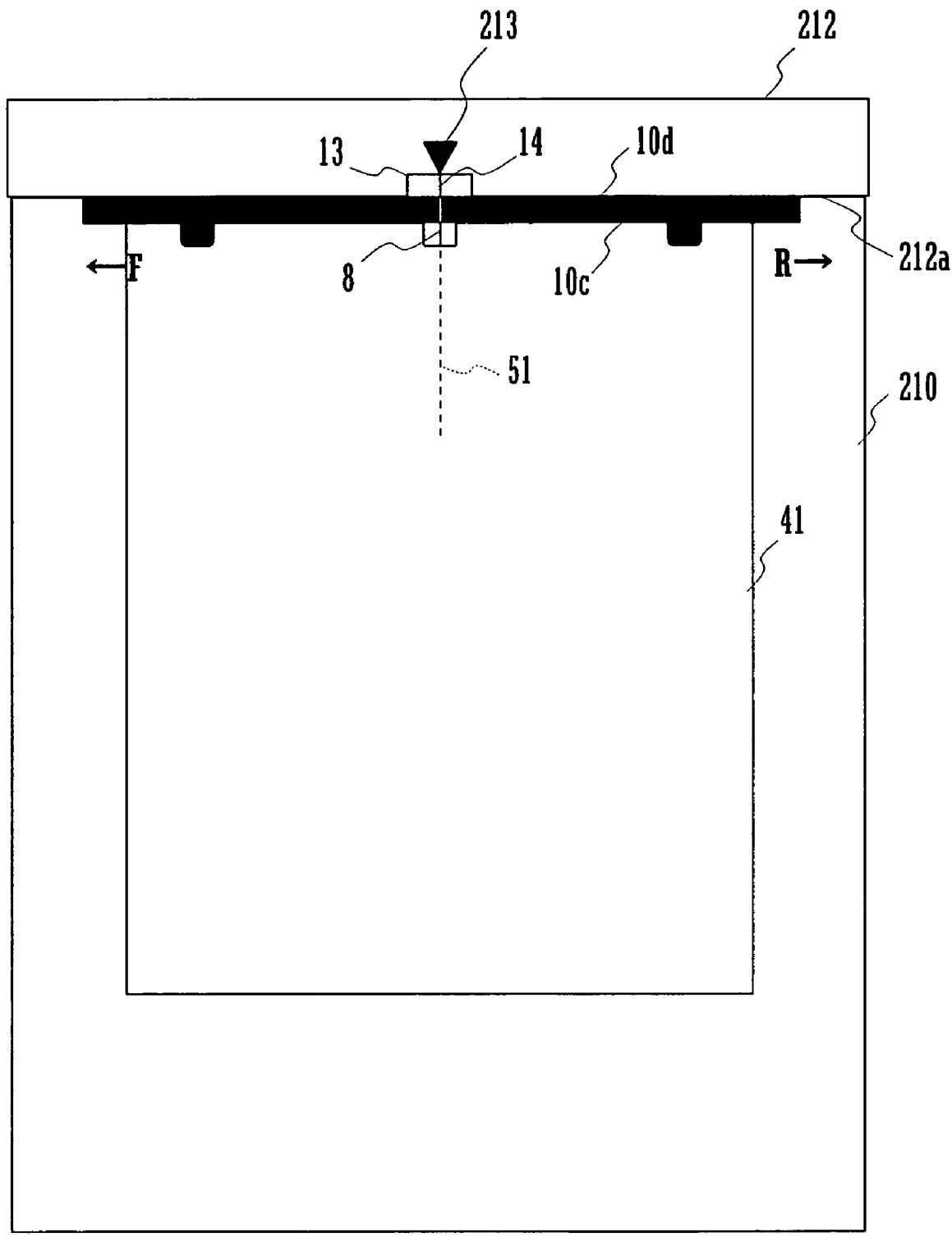
FIG. 4 is a plan view illustrating a state in which one-sided reference original paper is fixed on an original platen in the image position correcting task of the image forming apparatus.

FIG. 4 is a plan view illustrating a state in which reference original paper is fixed on an original platen in the image position correcting task of the image forming apparatus. In the image position correcting task of the image forming apparatus 100, the paper 41 (reference original) is fixed on the first original platen 210 using the correction instrument 1. The correction instrument 1 is placed on the first original platen 210 with the indicator 14 of the guide member 13 coinciding with a center indicator 213 of a placement position display plate 212 provided in an edge portion of the first original platen 210 and an entire outer side surface 10d of the main body 10 abutting a step portion 212a of the placement position display plate 212.

Figure 5:
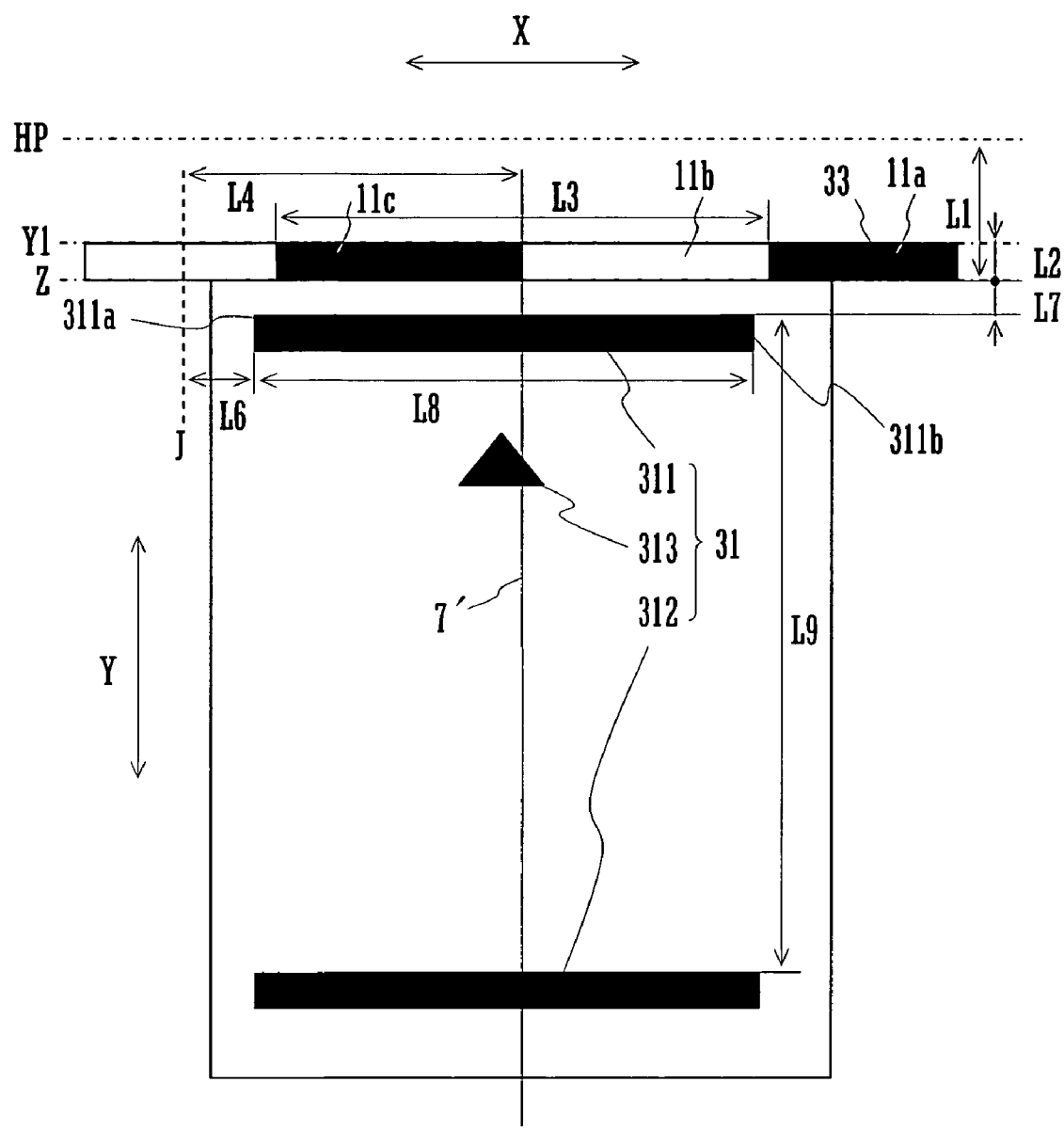
FIG. 5 is a diagram illustrating a first correction image read from a first original platen in an image position correcting task of the image forming apparatus.

The paper 41 (first reference original) on which the one-sided first reference image 31 is printed is inserted between the upper side of the first original platen 210 and the lower side of the paper pressing portion 2 of the correction instrument 1 so that an entire edge portion parallel to the width direction of the paper 41 abuts the side surface 10c of the main body 10 of the correction instrument 1 placed on the first original platen 210. In this case, a position in the width direction of the paper 41 is determined so that the broken line 51 of the paper 41 is positioned below the indicator 8 inscribed on the reference member 3 of the correction instrument 1. In this state, where the image reading section 200 performs an image reading task, an image for correction (correction image) including the reference image 31 (first reference image) and the reference image 33 (second reference image) are read as illustrated in FIG. 5.

Figure 8:
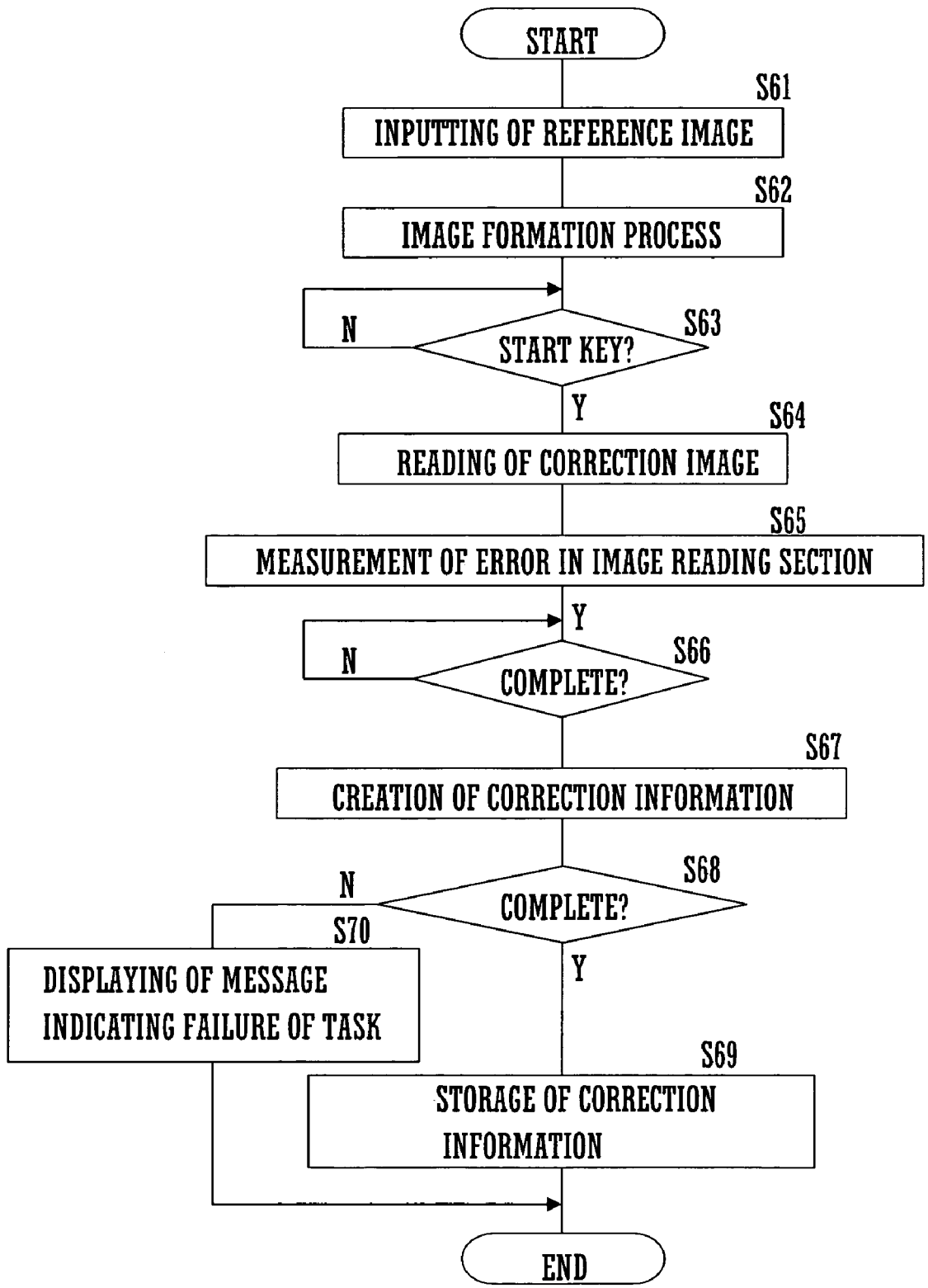
FIG. 8 is a flowchart illustrating an exemplary procedure of the image position correcting task in the image forming apparatus.

FIG. 8 is a flowchart illustrating an exemplary procedure of the image position correcting task in the image forming apparatus. As an example, the image position correcting task of the image forming apparatus 100 is performed before shipment from a factory. When a specific key is operated in the operation section, the CPU 401 starts an image position correcting task mode process to receive image data of the reference image 31 from a personal computer which is an external apparatus for the image position correcting task (S61: a reference image information inputting step). The CPU 401 subjects the received image data of the reference image 31 to a predetermined image process in the image processing section 402, and thereafter, temporarily stores the resultant image data in the image memory 404, and performs an image forming process with respect to the reference image 31 with image formation timing currently set (S62: a reference image forming step).

When the reference image 31 is input, the user activates application software for a print process in the external apparatus for the image position correcting task, and designates the image forming apparatus 100 as a target of the image position correcting task and instructs the image forming apparatus 100 to perform the print process with respect to the reference image 31. Generally, in the print process application software, top, bottom, right, and left margins can be set with respect to an image on paper to be printed. A size of the margin has an influence on the position of an image to be formed on paper. However, in the image forming process of S62, the triangular image 313 in the reference image 31 is located at the center in the main scanning direction, and the image data of the reference image 31 is supplied from the image memory 404 to an LSU 313 of the image forming section 300 so that a distance L7 of FIG. 5 is a second reference value. Therefore, the user does not need to set the value of the margin in the external apparatus.

When the image forming process is ended with respect to the reference image 31, the CPU 401 waits for an operation of the start key by the user (S63). When the user places the paper (reference original) 41, on which the reference image 31 is formed, at a predetermined position on the original platen 210 using the correction instrument 1 (an original placing step), and thereafter, operates the start key in the operation section, the CPU 401 operates the image reading section 200 to perform an image reading process with respect to the correction instrument 1 and the paper 41, thereby reading a correction image including the reference image 33 and the reference image 31, and stores the correction image thus read into the image memory 404 (S64: a correction image reading step).

Next, the CPU 401 measures a specific distance in the correction image stored in the image memory 404, and based on the measured distance, measures an error in an image formation position and an error in an image formation scaling factor in the image forming process, and an error in an image read position and an error in an image read scaling factor in the image reading process (S65: an image forming section error measuring step and an image reading section error measuring step). When the errors have been appropriately calculated, the CPU 401 creates, based on the measured errors, correction information for correcting image information read by the image reading section and correction information for correcting image information to be supplied to the image forming section (S66→S67: an image reading section correction information creating step and an image forming section correction information creating step), and stores the created correction information into the non-volatile memory 403 (S69). Then, the image position correcting task is ended.

When the correction instrument 1 or the paper 41 is inappropriately placed, the calculated error is beyond an adjustable range, or the error cannot be correctly calculated due to other malfunction, the CPU 401 indicates in the operation section or the external apparatus that the image position correcting task has failed (S68→S70), and ends the image position correcting task.

Figure 9:
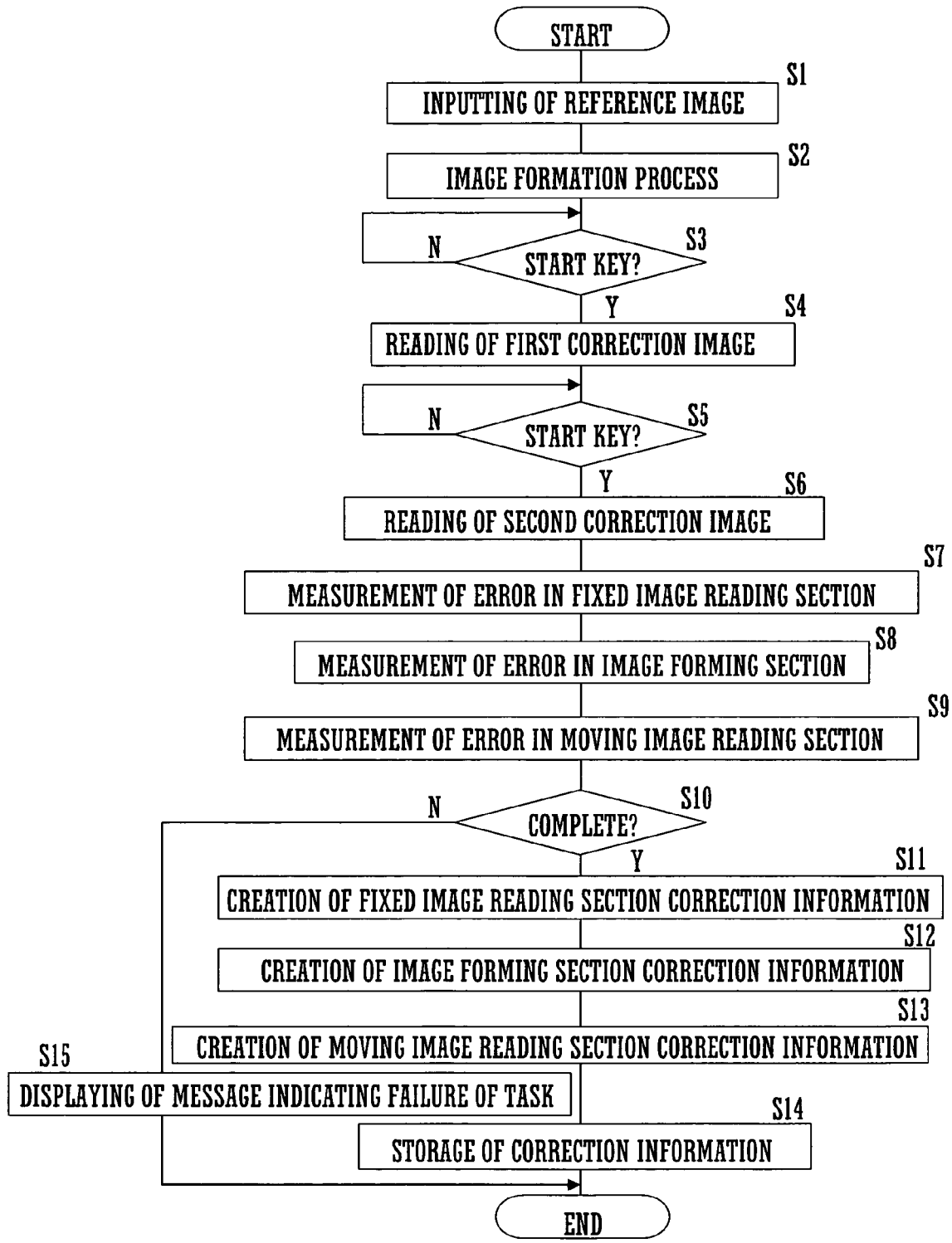
FIG. 9 is a flowchart illustrating another exemplary procedure of the image position correcting task in the image forming apparatus.

FIG. 9 is a flowchart illustrating another exemplary procedure of the image position correcting task in the image forming apparatus. The image position correcting task of the image forming apparatus 100 is performed before shipment from a factory. When a specific key is operated in the operation section, the CPU 401 starts an image position correcting task mode process to receive image data of the first reference images 31 and 32 from a personal computer which is an external apparatus for the image position correcting task (S1: a reference image information inputting step). The CPU 401 subjects the received image data of the first reference images 31 and 32 to a predetermined image process in the image processing section 402, and thereafter, temporarily stores the resultant image data into the image memory 404, and performs an image forming process with respect to the first reference images 31 and 32 with image formation timing currently set (S2: a reference image forming step).

When the first reference images 31 and 32 are input, the user activates application software for a print process in an external apparatus for the image position correcting task, and designates the image forming apparatus 100 as a target of the image position correcting task and instructs the image forming apparatus 100 to perform the print process with respect to the first reference images 31 and 32. Generally, in the print process application software, top, bottom, right, and left margins can be set with respect to an image on paper to be printed. A size of the margin has an influence on the position of an image to be formed on paper.

However, in the image forming process of S2, the triangular image 313 in the first reference images 31 and 32 is located at the center in the main scanning direction, and the image data of the first reference images 31 and 32 is supplied from the image memory 404 to the LSU 313 of the image forming section 300 so that the distance L7 of FIG. 5 is a second reference value. Therefore, the user does not need to set the value of the margin in the external apparatus.

Note that the CPU 401 receives selection of a correction task in the image forming process with respect to a one-sided original using the paper 41, or a correction task in the image forming process with respect to a both side original using the paper 42, before the reference image forming step of S2. The CPU 401 performs the image forming process with respect to only one of the first reference image 31 and the first reference image 32 in the reference image forming step of S2, depending on the selection.

When the image forming process is ended with respect to the first reference image 31 or 32, the CPU 401 waits for an operation of the start key by the user (S3). The user places the paper (one-sided reference original) 41, on which the one-sided first reference image 31 is formed, or the paper (both-side reference original) 42, on which the both-side first reference image 32 is formed, at a predetermined position on the first original platen 210 using the correction instrument 1, and thereafter, operates the start key in the operation section (not shown).

When the start key is operated, the CPU 401 first operates the image reading section 200 to perform an image reading process with respect to the correction instrument 1 and the paper 41 or 42 on the first original platen 210, thereby reading a first correction image including the second reference image 33 and the one-sided first reference image 31 or the both-side first reference image 32, and stores the first correction image thus read into the image memory 404 (S4: a first correction image reading step).

Next, the CPU 401 waits for an operation of the start key by the user again (S5). The user sets the paper (one-sided reference original) 41, on which the one-sided first reference image 31 is formed, or the paper (both-side reference original) 42, on which the both-side first reference image 32 is formed, on the original tray 221 of the ADF 220, and operates the start key of the operation section (not shown).

When the start key is operated, the CPU 401 operates the image reading section 200 and the ADF 220 to perform an image reading process with respect to the paper 41 or 42 transported on the second original platen, thereby reading a second correction image including the one-sided first reference image 31 or the both-side first reference image 32, and stores the second correction image thus read into the image memory 404 (S6: a second correction image reading step).

Thereafter, the CPU 401 measures a specific distance in the first correction image stored in the image memory 404, and based on the measured distance, measures an error in an image read position and an error in an image read scaling factor in the fixed original type image reading process, and an error in an image formation position and an error in an image formation scaling factor in the image forming process (S7 and S8: a fixed original type image reading section error measuring step and an image forming section error measuring step). Also, the CPU 401 measures a specific distance in the second correction image stored in the image memory 404, and measures an error in an image read position and an error in an image read scaling factor in the moving original type image reading process based on the measured distance, and the image formation position error and the image formation scaling factor error in the image forming process (S9: a moving image reading section error measuring step).

When the errors have been appropriately calculated, the CPU 401 creates, based on the measured errors, correction information for correcting image information read by the fixed image reading section and correction information for correcting image information to be supplied to the image forming section (S10→S11 to S13: a fixed image reading section correction information creating step, an image forming section correction information creating step, and a moving image reading section correction information creating step), and stores the created correction information into the non-volatile memory 403 (S14).

When the correction instrument 1 or the paper 41 is inappropriately placed on the first original platen 210, the calculated error is beyond an adjustable range, the operation of the ADF 220 is not normal, or the error cannot be correctly calculated due to other malfunction, the CPU 401 indicates in the operation section or the external apparatus that the image position correcting task has failed (S10→S15), and ends the image position correcting task.

Note that the second correction image reading step of S6 and the ADF error measuring step of S9 can be performed before the moving image reading section correction information creating step of S13.

When the ADF 220 does not have the both-side image reading function, or does not perform correction in an image forming process with respect to a both-side original, it is no longer necessary to perform image formation with respect to the both-side first reference image 32. In this case, the user may set the paper 41, on which the one-sided first reference image is formed, on the original tray 221 of the ADF 220 before the second correction image reading step. In this case, the second correction image is composed of the one-sided first reference image 31.

Hereinafter, a process of calculating an error in an image formation position and an error in an image formation scaling factor, and an error in an image read position and an error in an image read scaling factor in S65 and S6 to S9 of the image position correcting task will be described.

In the image forming apparatus 100, when image formation is performed on paper in the image forming section 300 with respect to an original image read from an original placed on the original platen 210 by the image reading section 200, an error occurring during the image reading process in the image reading section 200 and an error occurring during the image forming process in the image forming section 300 are combined, resulting in an image position error and an image scaling factor error between an output image and the original image.

On the other hand, when image formation is performed on the paper 41 in the image forming section 300 with respect to the reference image 31 previously stored in the image forming apparatus 100, and the paper 41 (reference original) is read by the image reading section 200, an image position error and an image scaling factor error between the read image and the reference image 31 is a combination of an error occurring during the image forming process and an error occurring during the image reading process.

Therefore, the image position error and the image scaling factor error between the output image and the original image which occur when image formation is performed on paper in the image forming section 300 with respect to the original image read by the image reading section 200, are equal to the image position error and the image scaling factor error between the read image and the reference image 31, which occur when an image on the paper 41 is read by the image reading section 200 after image formation is performed on the paper 41 in the image forming section 300 with respect to the previously stored reference image 31.

Also in the image forming apparatus 100, when image formation is performed on paper in the image forming section 300 with respect to an original image which is read by the image reading section 200 from an original transported on the second original platen 211 by the ADF 220, an error occurring during transportation of the original by the ADF 220, an error occurring during the image reading process by the image reading section 200, and an error occurring during the image forming process by the image forming section 300 are combined, resulting in an image position error and an image scaling factor error between the output image and the original image.

On the other hand, when the first reference image 31 or 32 previously stored in the image forming apparatus 100 is formed on the paper 41 or 42 using the image forming section 300, and the second correction image is read from the paper 41 or 42 (reference original) using the image reading section 200, an image position error and an image scaling factor error between the second correction image and the reference image 31 or 32 is a combination of an error occurring during the image forming process, an error occurring during transportation of the original by the ADF 220, and an error occurring during the image reading process.

Therefore, an image position error and an image scaling factor error between an output image and an original image which occur on paper when the original image which the image reading section 200 reads from an original transported by the ADF 220 is formed on the paper using the image forming section 300, are equal to an image position error and an image scaling factor error between the second correction image and the reference image 31 or 32 which occur when the previously stored first reference image 31 or 32 is formed on the paper 41 or 42 using the image forming section 300, and thereafter, the paper 41 or 42 is transported to the second original platen 211 using the ADF 220 and is read using the image reading section 200.

Therefore, in the image correcting method of the present invention, the previously stored first reference image 31 or 32 is formed on the paper 41 or 42 using the image forming section 300, and thereafter, an error in the fixed image reading section and an error in the image forming section 300 are measured separately based on the results of reading the first reference image 31 of the paper 41 or 42 and the reference image 33 of the correction instrument 1 on the first original platen 210 using the image reading section 200. Next, an error in the moving image reading section is measured based on the result of reading the first reference image 31 or 32 of the paper 41 or 42 on the second original platen 211 using the image reading section 200 and the error in the image forming section 300.

The errors thus measured are corrected in the image reading section 200, the image forming section 300, and the ADF 220, respectively, thereby making it possible to form an image at an appropriate position and an appropriate scaling factor in the image forming process of the image forming apparatus 100.

Note that Example 1 is an example in which an error is measured using the paper 41 on which the one-sided first reference image 31 is formed, and Example 2 is an example in which an error is measured using the paper 42 on which the both-side first reference image 32 is formed.

EXAMPLE 1

<Measurement of Error>

A. Measurement of Error in Fixed Image Reading Section

Prior to measurement of an error in the fixed image reading section composed of the first original platen 210, the first mirror base 231, the second mirror base 232, the lens 233, and the CCD 234, the fixed original type image reading process is performed by the fixed image reading section while the paper 41 on which the reference image 31 is formed or the paper 42 on which the reference image 32 is formed is fixedly placed at a predetermined position on the original platen 210 via the correction instrument 1, as illustrated in FIG. 4 or 16. By the fixed original type image reading process, measurement of an error in the fixed image reading section is performed using the first correction image that is read as shown in FIG. 5 as an example. The first correction image includes the reference image 31 of the paper 41 and the reference image 33 of the correction instrument 1.

(1) Error in Read Start Position in Subsidiary Scanning Direction

In the state of FIG. 4, an image reading process is performed with respect to the correction instrument 1 and the paper 41 placed on the original platen 210 to read the first correction image including the reference image 33 and the reference image 31 of FIG. 5. In the first correction image thus read, a distance L1 from an HP sensor change line to an end line Z of the correction instrument 1 is measured. The HP sensor change line corresponds to timing with which a change occurs in an output signal of an HP sensor which detects the first mirror base 231 at a home position (HP) in the fixed original type image reading process. The distance L1 is measured using an image of the first black portion 11c or the second black portion 11d of the correction instrument 1. In other words, the distance L1 is measured based on timing with which image data changes from the black portion of the correction instrument 1 to a white area of the original. The distance L1 is represented by the number of pixels.

Next, a position obtained by subtracting a width L2 (10 mm in this example) of the correction instrument 1 from the measured end line Z of the correction instrument 1 is assumed to be a read start position Y1 in the subsidiary scanning direction. The read start position Y1 is stored in the non-volatile memory 403 as an original leading edge position in an actual image reading process.

(2) Error in Image Read Scaling Factor in Main Scanning Direction

In the correction image of FIG. 5, a total length L3 of a length of the first white portion 11b and a length of the first black portion 11c is measured, and a ratio of the total length L3 thus measured to a length of the band-like image 311 in the reference image 31 is calculated as an image read scaling factor error in the main scanning direction in the fixed image reading section. The image read scaling factor error in the main scanning direction in the fixed image reading section is reflected in the image reading process of the image reading section 200, but not in the image forming process of the image forming section 300. The total length L3 is also represented by the number of pixels.

Note that the total length of the length of the first white portion 11b and the length of the first black portion 11c in the correction instrument 1 is set to be the same as a length in a length direction of the band-like image 311 in the reference image 31.

Also, an error in a read scaling factor in the main scanning direction is specifically calculated by the following expression 1.

(Read scaling factor error in the main scanning direction)=(Number of read pixels in the total length L3)÷(Number of pixels in the length direction of the band-like image 311 in the reference image 31)     Expression 1

For example, when an input resolution and an output resolution in the main scanning direction are 600 dpi, since the length in the length direction of the band-like image 311 is 190 mm, the number of pixels in the length direction of the band-like image 311 in the reference image 31 is:

190÷25.4×600=4488 (pixels).

When the number of read pixels of the total length L3 is 4500, an error A1 in the read scaling factor in the main scanning direction is represented by the following, based on Expression 1:

$A1=4500 \div 4488 \times 100=100.27$ (%).

Therefore, an image read in the fixed image reading section is larger by 0.27% than its original image.

The read scaling factor error in the main scanning direction is stored in the non-volatile memory 403 included in the image forming apparatus 100.

(3) Error in Read Start Position in Main Scanning Direction

Figure 6:
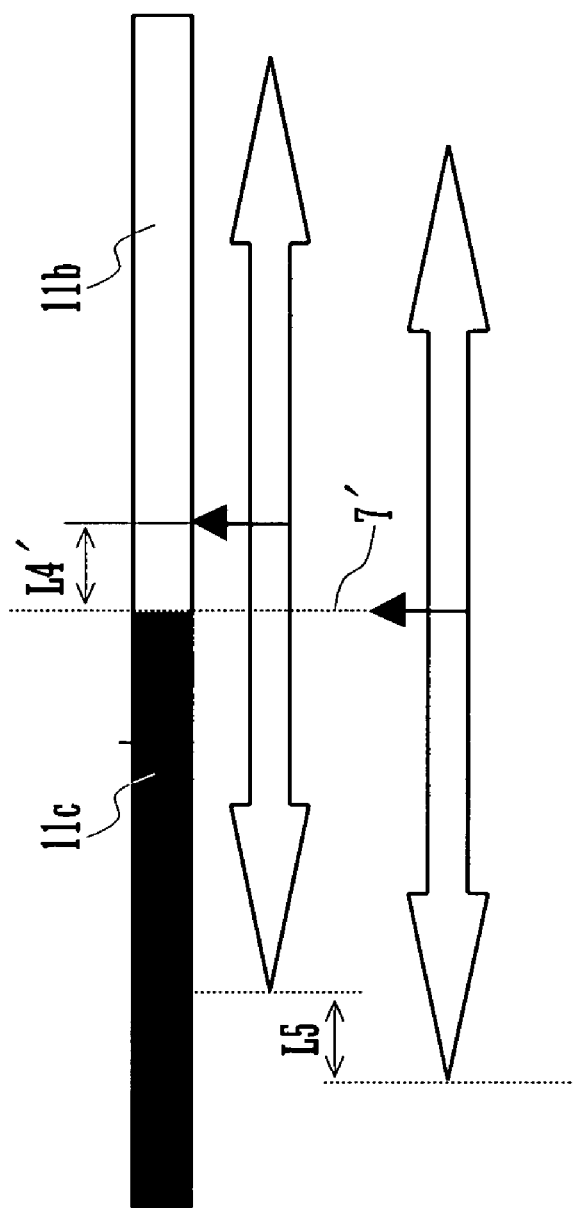
FIG. 6 is a diagram illustrating a measurement position of a major portion in the correction image.

In the first correction image of FIG. 5, the center line 7' of the correction instrument 1 is extracted, and a distance L4 from a read start position J in the main scanning direction to the center line 7' is measured. Next, the distance L4 thus measured is compared with a center position on design to calculate an error in the center position (an error L4' in FIG. 6). The center position error is specifically calculated by Expression 2 below.

(Center position error)=(Number of pixels in the distance L4)−(Position of center pixel)     Expression 2

Note that, for example, assuming that the number of pixels in a read area in the main scanning direction of the CCD 234 of the image reading section 200 is 5300, when a center position of an original is correctly read, the number of pixels in the distance L4 on design is:

5300÷2=2650 (pixels).

When the number of pixels in the distance L4 measured from the reference image 33 is P2, an error A2 in the read start position is represented as follows, taking into consideration the image read scaling factor error in the main scanning direction:

$A2=2650-(P2 \times A1 \div 100)$.

The calculated center position error L4' is stored as an error in the read start position in the main scanning direction (an error L5 of FIG. 6) in the non-volatile memory 403 of the image forming apparatus 100.

B. Measurement of Error in Image Forming Section 300

Measurement of an error in the image forming section 300 is performed as appropriate with reference to each value obtained when measuring an error in the image reading section 200.

(1) Error in Image Formation Start Position in Main Scanning Direction

In the first correction image of FIG. 5, a distance L6 from the read start position J in the main scanning direction to an edge portion 311a of the band-like image 311 which is closer to the read start position J than an edge portion 311b of the band-like image. 311 is measured. The distance L6 is represented by the number of read pixels, and is here assumed to be S pixels.

Here, since the read start position error in the main scanning direction in the image reading section 300 has been obtained, a result (the number of pixels) from subtraction of this error from the number of pixels S is compared with a first reference value. The first reference value refers to the number of pixels corresponding to a distance between the read start position J in the main scanning direction set on design and the edge portion 311a of the band-like image 311 in the reference image 31. An error in the image formation start position in the main scanning direction is specifically calculated by Expression 3 below.

(Image formation start position error in the main scanning direction)=(Number of pixels S)−(Read start position error in the main scanning direction)−(First reference value)  Expression 3

For example, when the input resolution and the output resolution of the main scanning direction are 600 dpi and the number of read pixels S in the CCD 234 is 5300, the distance L6 on design is:

(5300−190÷25.4×600)÷2=406 (pixels).

Assuming that the number of read pixels in the distance L6 is P3, an error A3 in the image formation start position in the main scanning direction is represented as follows, taking the errors A1 and A2 into consideration:

$A3 = 406 - \{(P3-A2) \times A1 \div 100\}$ (pixels).

The calculated image formation start position error in the main scanning direction is stored in the non-volatile memory 403 included in the image forming apparatus 100.

(2) Error in Image Formation Start Position in Subsidiary Scanning Direction

In the correction image of FIG. 5, the distance L7 from the end line Z of the image position correction instrument 1 to a position of a side in parallel to the length direction of the band-like image 311 closer to the correction instrument 1 is measured. The distance L7 is represented by the number of read pixels, and is here assumed to be T pixels.

Here, since the read start position error in the subsidiary scanning direction in the image reading section 200 has already been obtained, a result (the number of pixels) from subtraction of this error from the number of pixels T is compared with a second reference value. The second reference value refers to the number of pixels corresponding to a distance between the read start position Y1 in the subsidiary scanning direction set on design and a position K closer to the correction instrument 1 of the band-like image 311 in the previously stored reference image 31. An error in the image formation start position in the subsidiary scanning direction is specifically calculated by Expression 4 below.

(Image formation start position error in the subsidiary scanning direction)=(Number of pixels T)−(Read start position error in the subsidiary scanning direction)−(Second reference value)  Expression 4

The calculated image formation start position error in the subsidiary scanning direction is stored in the non-volatile memory 403 included in the image forming apparatus 100.

(3) Error in Image Formation Scaling Factor in Main Scanning Direction

In the first correction image of FIG. 5, a length L8 in the main scanning direction of the band-like image 311 is measured. The length L8 is represented by the number of read pixels, and is here assumed to be the number of pixels U. The measured length L8 is compared with a third reference value. The third reference value refers to the number of pixels corresponding to a length of the band-like image in the previously stored reference image 31. An image formation scaling factor error in the main scanning direction of the image forming section 300 is specifically calculated based on Expression 5 below, taking into consideration an image read scaling factor error in the main scanning direction in the image reading section 200.

(Image formation scaling factor error in the main scanning direction)=(Number of pixels U)÷(Third reference value)÷(Image read scaling factor error in the main scanning direction)  Expression 5

The calculated image formation scaling factor error in the main scanning direction is stored in the non-volatile memory 403 included in the image forming apparatus 100.

(4) Error in Image Formation Scaling Factor in Subsidiary Scanning Direction

In the first correction image of FIG. 5, a distance L9 between the two band-like images 311 and 312 is measured. The distance L9 is represented by the number of read pixels, and is here assumed to be the number of pixels V. The distance L9 thus measured is compared with a fourth reference value. The fourth reference value refers to the number of pixels corresponding to a distance between the band-like images 311 and 312 in the previously stored reference image 31. An image formation scaling factor error in the subsidiary scanning direction in the image forming section 300 is specifically calculated by Expression 6 below.

(Image formation scaling factor error in the subsidiary scanning direction)=(Number of pixels V)÷(Fourth reference value)  Expression 6

The calculated image formation scaling factor error in the main scanning direction is stored in the non-volatile memory 403 included in the image forming apparatus 100.

C. Measurement of Error in Moving Image Reading Section

Figure 15:
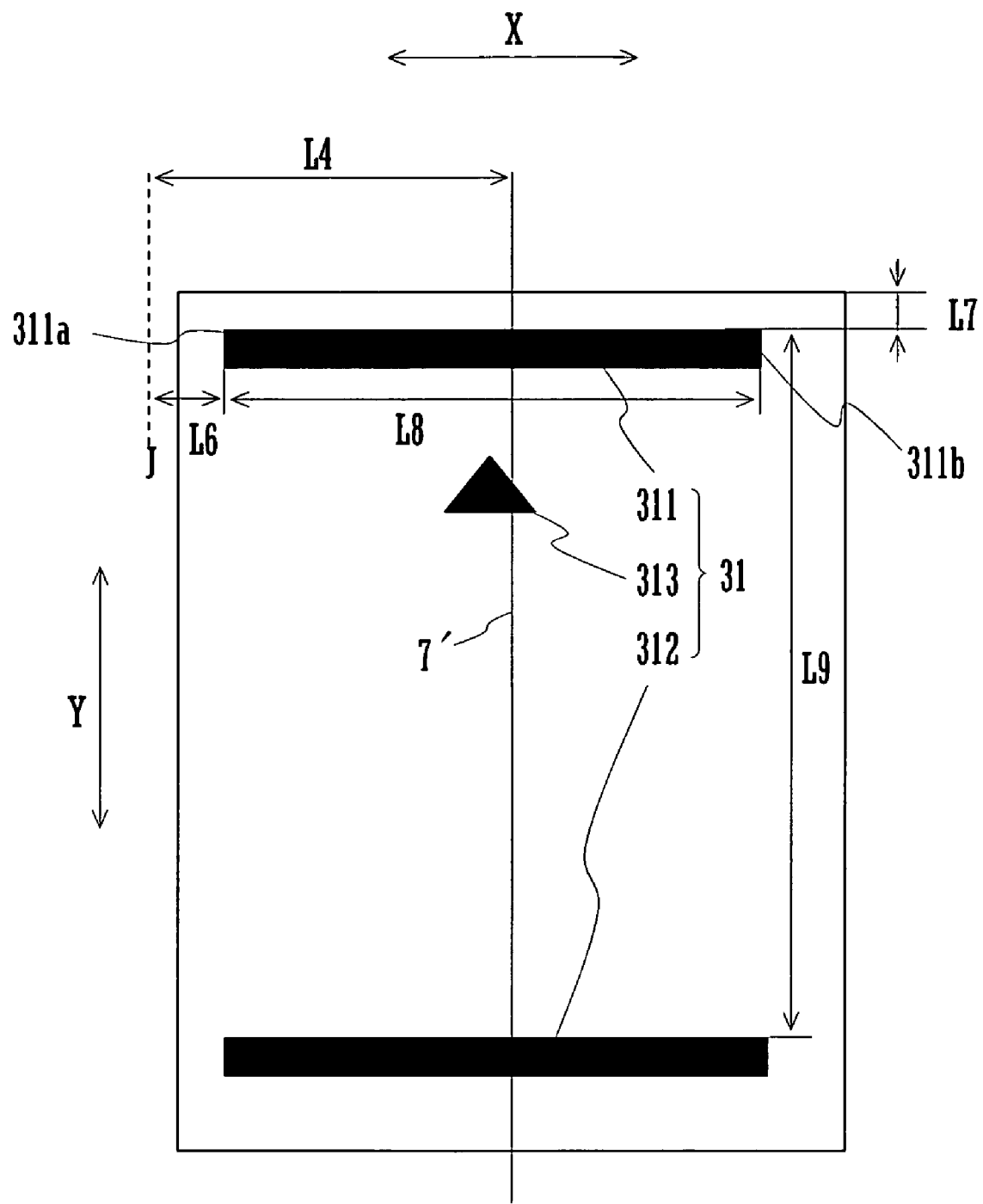
FIG. 15 is a diagram illustrating a second correction image read from a second original platen in an image position correcting task of the image forming apparatus.

Measurement of an error in the moving image reading section composed of the second original platen 211 and the ADF 220 is performed using, for example, a second correction image which is read as illustrated in FIG. 15 by setting the paper 41 on which the reference image 31 is formed on the original tray 221 of the ADF 220 and performing an image reading process using the image reading section 200. Therefore, the paper 41 is set on the original tray 221 of the ADF 220 with an image forming side thereof facing upward and the images 311, 312, and 313 being to be read in this order. The second correction image includes only the reference image 31 of the paper 41. The error measurement in the ADF 220 is performed as appropriate with reference to the values obtained when measuring the error in the image forming section 300. This is because an image on the paper 41 read on the second original platen 211 via the ADF 220 includes an error occurring during image formation in the image forming section 300.

(1) Error in Read Start Position in Main Scanning Direction

In the second correction image of FIG. 15, a distance L6 from the read start position J in the main scanning direction to the edge portion 311a of the band-like image 311 which is closer to the read start position J than the edge portion 311b of the band-like image 311 is measured. The distance L6 is represented by the number of read pixels, and is here assumed to be S' pixels.

Here, since the image formation start position error in the main scanning direction in the image forming section 300 has been obtained, a result (the number of pixels) from subtraction of this error from the number of pixels S' is compared with a first reference value. The first reference value refers to the number of pixels corresponding to the distance between the read start position J in the main scanning direction set on design and the edge portion 311a of the band-like image 311 in the reference image 31. An image formation start position error in the main scanning direction is specifically calculated by Expression 3' below.

(Read start position error in the main scanning direction)=(the number of pixels S')−(Image formation start position error in the main scanning direction)−(First reference value)   Expression 3'

The calculated read start position error in the main scanning direction is stored in the non-volatile memory 403 included in the image forming apparatus 100.

Note that the image formation start position error in the main scanning direction in the image forming section 300 is measured, taking into consideration the image reading start position error in the main scanning direction in the image reading section 200. Therefore, the read start position error in the main scanning direction thus measured is an error which mainly occurs during the original transport operation of the ADF 220, excluding an influence, such as an error in attachment of the fixed image reading section in the image reading section 200 or the like.

(2) Error in Read Start Position in Subsidiary Scanning Direction

In the second correction image of FIG. 15, a distance L7 from a front end of the second correction image to the position of the side in parallel to the length direction of the band-like image 311 closer to the correction instrument 1 is measured. The distance L7 is represented by the number of read pixels, and is here assumed to be T'.

Here, the image formation start position error in the subsidiary scanning direction in the image forming section 300 has already been obtained, a result (the number of pixels) from subtraction of this error from the number of pixels T' is compared with a second reference value. The second reference value refers to the number of pixels corresponding to a distance between the read start position Y1 in the subsidiary scanning direction set on design and a position closer to the correction instrument 1 of the band-like image 311 in the previously stored reference image 31. An image formation start position error in the subsidiary scanning direction is specifically calculated by Expression 4' below.

(Read start position error in the subsidiary scanning direction)=(Number of pixels T')−(Image formation start position error in the subsidiary scanning direction)−(Second reference value)   Expression 4'

The calculated read start position error in the subsidiary scanning direction is stored in the non-volatile memory 403 included in the image forming apparatus 100.

Note that the image formation start position error in the subsidiary scanning direction in the image forming section 300 is measured, taking into consideration the image reading start position error in the subsidiary scanning direction in the image reading section 200. Therefore, the read start position error in the subsidiary scanning direction thus measured is an error which mainly occurs during the original transport operation of the ADF 220, excluding an influence, such as an error in attachment of the fixed image reading section in the image reading section 200 or the like.

(3) Error in Image Read Scaling Factor in Subsidiary Scanning Direction

In the second correction image of FIG. 15, a distance L9 between the two band-like images 311 and 312 is measured. The distance L9 is represented by the number of read pixels, and is here assumed to be the number of pixels V'. The distance L9 thus measured is compared with a fourth reference value. The fourth reference value refers to the number of pixels corresponding to a distance between the band-like images 311 and 312 in the previously stored reference image 31. An image formation scaling factor error in the subsidiary scanning direction in the image formation section 300 is specifically calculated by Expression 6' below.

(Read scaling factor error in the subsidiary scanning direction)=(Number of pixels V')÷(Fourth reference value)   Expression 6'

The calculated image formation scaling factor error in the main scanning direction is stored in the non-volatile memory 403 included in the image forming apparatus 100.

Note that the operations of the first mirror base 231 and the second mirror base 232 in the image reading section 200 are stopped during a moving original type image reading process of reading an image from an original which is being transported by the ADF 220. Therefore, an image formation scaling factor error in a scanning direction in the moving image reading section is caused only by an error in the original transport speed of the ADF 220.

(4) Error in Image Read Scaling Factor in Main Scanning Direction

An image read scaling factor error in the main scanning direction which occurs in an image read by the second original platen 211 from an original transported by the ADF 220 is equal to the image read scaling factor error in the main scanning direction in the fixed image reading section which is measured in Section A(2) described above, and therefore, does not need to be measured as an error in the moving image reading section.

<Correction of Error>

Based on the results of the above-described error measurement, the image position and the image scaling factor are corrected in the image reading section 200 and the image forming section 300 in each of a scanner mode and a copier mode of the image forming apparatus 100 which uses the ADF 220. Hereinafter, image position correcting tasks of the image reading section and the image forming section in each mode process will be described.

Note that the image reading start position errors in the main scanning direction and the subsidiary scanning direction and the read scaling factor error in the subsidiary scanning direction, in the moving image reading section, are previously corrected by control of on/off timing of the original sensor 229a, control of rotation start timing of the resistration roller 225, and control of rotational speeds of the rollers 224 to 227 in the ADF 220. Therefore, it is not necessary that an error in the moving image reading section be corrected for each original image read by the moving original type image reading process.

Note that, in the case where there is a clear relationship between an error in the moving image reading section and an error in the fixed image reading section, when an original image read via the ADF 220 is stored into the image memory 404, or when the original image is supplied from the image memory 404 to the image forming section 300, the error in the moving image reading section and the error in the fixed image reading section can be corrected simultaneously.

A. Error Correction in Image Reading Process in Scanner Mode

In a scanner mode in which the image forming apparatus 100 is used as a scanner, and image data read by the image reading section 200 is output to an external apparatus, such as a personal computer or the like, the following image position correcting tasks are performed in the image reading section 200.

(1) Image Read Position Correcting Task

In the scanner mode, the image data read by the image reading section 200 is corrected in the main scanning direction and the subsidiary scanning direction by an error in a read start position in the main scanning direction and an error in a read start position in the subsidiary scanning direction, respectively.

Note that, in addition to the corrected image data, number-of-pixels data indicating the read start position errors in the main scanning direction and the subsidiary scanning direction can also be output.

(2) Image Read Scaling Factor Correcting Task

In the scanner mode, a size in the main scanning direction of the image data read by the image reading section 200 is corrected by multiplying with the reciprocal of an error in an image read scaling factor in the main scanning direction before output. The image read scaling factor is corrected by so-called electronic zooming in which enlargement/reduction is performed within an image memory.

Note that, in addition to the corrected image data, data indicating the image read scaling factor error in the main scanning direction can be output.

B. Error Correction in Image Reading Process and Image Forming Process in Copier Mode In a copier mode in which the image forming apparatus 100 is used as a copier, and image data read by the image reading section 200 is used to form an image on paper in the image forming section 300, the following image position correcting task is performed in the image reading section 200 and the image forming section 300.

(1) Image Position Correcting Task

In the copier mode, the image data read by the image reading section 200 is corrected in the main scanning direction and the subsidiary scanning direction by a sum amount of an error in a read start position and an error in an image formation start position in the main scanning direction, and a sum amount of an error in a read start position and an error in an image formation start position in the subsidiary scanning direction, respectively, and the corrected image data is used to form an image on paper. For each of the main scanning direction and the subsidiary scanning direction, the sum amount of the read start position error and the image formation start position error can be previously stored in a memory of the image forming apparatus 100.

(2) Image Scaling Factor Correcting Task

In the copier mode, the image data read by the image reading section 200 is enlarged or reduced in the main scanning direction and the subsidiary scanning direction by a scaling factor which corrects errors in an image read scaling factor and an image formation scaling factor in the main scanning direction, and a scaling factor which corrects errors in an image read scaling factor and an image formation scaling factor in the subsidiary scanning direction, and the corrected image data is used to form an image on paper. For each of the main scanning direction and the subsidiary scanning direction, scaling factor which corrects the image read scaling factor error and the image formation scaling factor error can be previously stored in a memory of the image forming apparatus 100.

Note that scaling factors obtained by multiplying the image read scaling factor error with the image formation scaling factor error for each of the main scanning direction and the subsidiary scanning direction can be stored in a memory of the image forming apparatus of the invention, and these scaling factors can be used to correct the image scaling factor. Enlargement or reduction of an image is performed by so-called electronic zooming, which performs enlargement/reduction of image data within an image memory.

In the image position correcting task, the CPU 401 performs an image reading process for a corrected image in the image reading section 200. An electrical signal which is output by the CCD 234, depending on the amount of received light, is converted into a digital signal by the A/D converter 239, and the digital signal is input as image data into the image processing section 402. The image processing section 402 subjects the received image data to a predetermined image process, and stores the resultant data into the image memory 404. Thereafter, the CPU 401 reads image data of a required portion from the image memory 404, and measures and calculates an error. The CPU 401 stores the measured and calculated error information into the non-volatile memory 403.

In an ordinary copier mode image forming process, the CPU 401 reads the error information from the non-volatile memory 403, and supplies the read error information to the image processing section 402 and the image forming section 300. The image forming section 300 starts an operation of the ADF 220 with timing which is adjusted based on the supplied error information, and transports an original so that the original faces the original platen 211 with appropriate timing.

The image processing section 402 performs an image process with respect to the image data received from the image reading section 200 based on the supplied error information, and outputs image data resulting from the image process via the image memory 404 to the exposure unit 313 of the image forming section 300. The exposure unit 313 irradiates the photoreceptor drum 311 with image light which is modulated based on the received image data with timing which is determined based on the error information. Also, the image forming section 300 guides paper into between the photoreceptor drum 311 and the transferrer 315 with timing which is adjusted based on the supplied error information.

Figure 10:
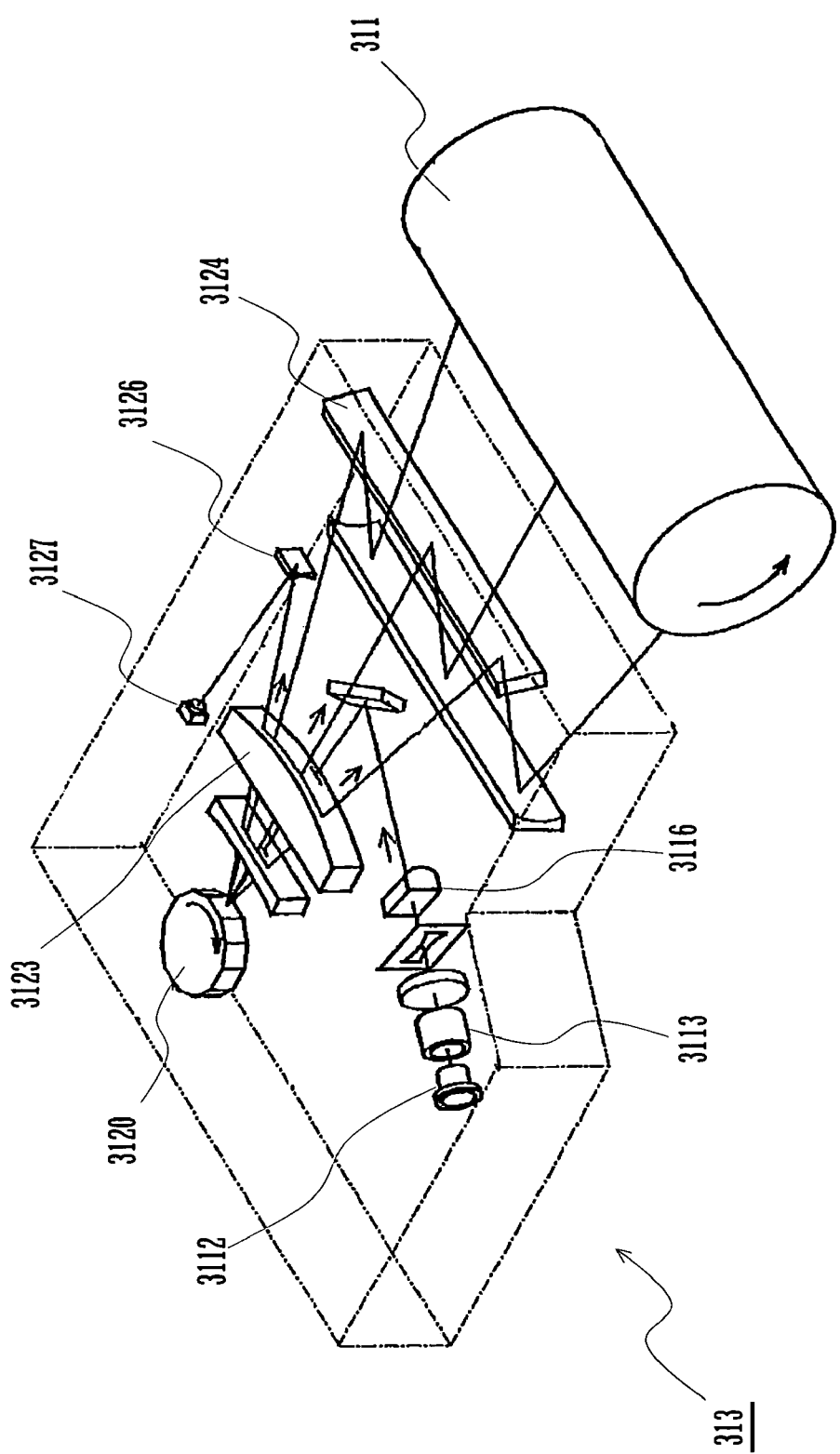
FIG. 10 is a diagram illustrating an exemplary exposure unit provided in the image forming apparatus.

FIG. 10 is a diagram illustrating an exemplary exposure unit provided in the image forming apparatus. The exposure unit 313 is, for example, a laser scan unit (LSU) which exposes the photoreceptor drum 311 to laser light which is modulated based on image data. The LSU 313 images the laser light emitted by a semiconductor laser 3112 onto the surface of the photoreceptor drum 311 via a collimator lens 3113, a cylindrical lens 3116, a polygon mirror 3120, a f-θ lens 3123, a turnback mirror 3124, and the like.

The collimator lens 3113 converts laser light which is diffused light emitted by the semiconductor laser 2 into parallel light. The cylindrical lens 3116 condenses the laser light in the subsidiary scanning direction so that an error in an irradiated position on the photoreceptor drum 311 which is caused by face tangle of a reflection surface of the polygon mirror 3120 can be easily corrected. The polygon mirror 3120 is rotated in a direction indicated with an arrow at a constant speed, thereby achieving exposure scanning in the main scanning direction on the surface of the photoreceptor drum 311 using laser light reflected on each reflection surface. The f-θ lens 3123 deviates and images the laser light which is moved in the main scanning direction at a constant angular speed in association with the rotation of the polygon mirror 3120 so that the laser light is moved on the surface of the photoreceptor drum 311 at a constant speed. The f-θ lens 3123 also corrects an error in an irradiated position on the photoreceptor drum 311 which is caused by face tangle of the reflection surface of the polygon mirror 3120. Thereby, the laser light is used as scanning light which is image light with which the surface of the photoreceptor drum 311 is scanned in the main scanning direction to form an electrostatic latent image on the surface of the photoreceptor drum 311.

In the LSU 313, in order to control timing of exposure in the main scanning direction, a mirror 3126 is provided within a scanning range of the laser light which has passed through the f-θ lens 3123 and outside an image formation area so that the laser light is input into a BD sensor 3127. A control section of the LSU 313 synchronizes image draw timing of each scan line based on timing of detection of the laser light by the BD sensor 3127.

Specifically, modulation of the laser light based on the image data is started at a time when a predetermined time has elapsed after detection of the laser light by the BD sensor 3127. The predetermined time is a time required to expose an image draw start position on the photoreceptor drum 311 to light after the laser light is detected by the BD sensor 3127. Therefore, by increasing or decreasing the predetermined time, a position in the main scanning direction of an image formed on paper via the photoreceptor drum 311 is changed. In addition, by adjusting a time from the start of transportation of paper to the start of modulation of the laser light based on the image data, a position in the subsidiary scanning direction of an image formed on paper via the photoreceptor drum 311 is changed.

EXAMPLE 2

As described above, in Example 2, the paper 42 on both sides of which the both-side first reference image 32 is formed is used to measure an error in the ADF 220 when the image is read from both the sides. As illustrated in FIG. 3(B), the both-side first reference image 32 includes the top-side first reference image 32a denoted by characters "SIDE B" and the bottom-side first reference image 32b denoted by characters "SIDE A".

Note that, when the image is read from both the sides in the ADF 220, the leading end and the tailing end in a transport direction of an original are reversed between when the image is read from the top side of the original and when the image is read from the bottom side of the original, i.e., a reading direction of the image is reversed. In other words, the vertical direction of the bottom-side image of the original is reverse to that of the top-side image of the original, when it is read. Note that, as illustrated in FIG. 3(B), since the vertical directions of the top-side first reference image 32a and the bottom-side first reference image 32b formed on the top and bottom sides of the paper 42, respectively, are reverse to each other, the top-side first reference image 32a are the bottom-side first reference image 32b are eventually read in the same vertical direction.

<Measurement of Error>

A. Measurement of Error in Fixed Image Reading Section

An error in the fixed image reading section is measured as follows. The paper 42 on which the first reference image 32 is formed is fixedly placed at a predetermined position on the first original platen 210 using the correction instrument 1 with the bottom-side first reference image 32b facing upward as illustrated in FIG. 16(A) or the top-side first reference image 32a facing upward as illustrated in FIG. 16(B). In this state, the first correction image is read by the fixed image reading section. A broken line 52 which halves a length in a width direction (the main scanning direction) of the paper 42 is previously formed on the paper 42.

Either the thus-read first correction image including the top-side first reference image 32a and the second reference image 33 of the correction instrument 1, or the first correction image including the bottom-side first reference image 32b and the second reference image 33 of the correction instrument 1, is used to measure an error in the fixed image reading section in a manner similar to the process A of Example 1.

Note that an image reading process may be performed both when the paper 42 is placed with the bottom-side first reference image 32b facing upward as illustrated in FIG. 16(A) and when the paper 42 is placed with the top-side first reference image 32a facing upward as illustrated in FIG. 16(B), to read the first correction image for the topside and the first correction image for the bottom side, and both an error in image formation on the top side and an error in image formation on the bottom side in the image forming section 300 may be measured. When a difference is present between the error in image formation on the top side and the error in image formation on the bottom side in the image forming section 300, there is a possibility that the result of measurement of an error in image reading on the top side and the result of measurement of an error in image reading on the bottom side in the moving image forming section (the ADF 220) described below are affected. Note that, in this example, an error in the moving image reading section is measured, assuming that the error in image formation on the top side and the error in image formation on the bottom side in the image forming section 300 are the same.

B. Measurement of Error in Image Forming Section 300

Either the first correction image including the first print-side image 32a and the second reference image 33 of the correction instrument 1, or the first correction image including the second print-side image 32b and the second reference image 33 of the correction instrument 1, is used to measure an error in the image forming section 300 in a manner similar to the process B of Example 1.

C. Measurement of Error in Moving Image Reading Section

An error in the moving image forming section is measured as follows. The paper 42 both sides of which the both-side first reference image 32 is formed is set on the original tray 221 of the ADF 220. A both-side image reading process is performed by the image reading section 200. A second correction image thus read is used. In this case, the paper 42 is set on the original tray 221 of the ADF 220 with the first print side on which the top-side first reference image 32a is formed facing upward, and the images 311, 312, and 313 being to be read in this order. The ADF 220 reverses the paper 42 so that both the top and bottom sides of the paper 42 successively face the second original platen 211, and therefore, in this case, transports the paper 42 two consecutive times. The top-side first reference image 32a and the bottom-side first reference image 32b which are formed on the paper 42 are read as a top-side second correction image and a bottom-side second correction image in this order.

Thereafter, for each of the top-side first reference image 32a and the bottom-side first reference image 32b, an error in a read start position in the main scanning direction, an error in a read start position in the subsidiary scanning direction, and an error in an image read scaling factor in the subsidiary scanning direction, are measured in a manner similar to the process C of Example 1. The measured errors are stored as errors in top-side image reading and bottom-side image reading in the non-volatile memory 403 of the image forming apparatus 100.

<Correction of Error>

Based on the results of the above-described error measurements, the image position and the image scaling factor of a two-sided original are corrected in the image reading section 200 and the image forming section 300 in each of the scanner and copier mode processes performed in the image forming apparatus 100 using the ADF 220, in a manner similar to that of Example 1.

Note that the image reading start position errors in the main scanning direction and the subsidiary scanning direction and the read scaling factor error in the subsidiary scanning direction, in the moving image reading section, are previously corrected by control of on/off timing of the original sensor 229a, control of rotation start timing of the resistration roller 225, and control of rotational speeds of the rollers 224 to 227. Note that, when a top-side image of an original is read, an error measured using the top-side first reference image 32a is used to perform correction, and when a bottom-side image of an original is read, an error measured using the bottom-side first reference image 32b is used to perform correction.

EXAMPLE 3

In the image position correcting tasks of Examples 1 and 2 described above, an error in an image read scaling factor in the subsidiary scanning direction in the fixed image reading section is not calculated. Therefore, when an error in an image formation scaling factor in the subsidiary scanning direction in the image forming section 300 is corrected, the image read scaling factor error in the subsidiary scanning direction in the fixed image reading section is not taken into consideration (see Expressions 5 and 6). By contrast, in an image position correcting task of Example 3, the image read scaling factor error in the subsidiary scanning direction in the fixed image reading section is also corrected. Note that a task of placing the correction instrument 1 and an original for correction on the original platen 210 and reading an image of the correction instrument 1 and the reference image 31 as an image for correction, is similar to that of Example 1.

Hereinafter, only a process that is performed in addition to those of Example 1 will be described. In other words, in the image position correcting task of Example 2, the following process is performed in addition to the image position correcting task of Example 1. Note that only the process of correcting the image formation scaling factor error in the subsidiary scanning direction is replaced with a method described below.

<Measurement of Error>

A. Measurement of Error in Fixed Image Reading Section

An error in the fixed image reading section is measured using an image read from the bottom side of the correction instrument 1.

In image data of the correction image thus read, a width of the correction instrument 1 is measured, the measured width is compared with a width in the subsidiary scanning direction of the rectangular image 311 in the reference image 31 stored in the image memory 404, and an error between these widths is calculated as an error in an image read scaling factor in the subsidiary scanning direction. The calculated image read scaling factor error in the subsidiary scanning direction is taken into consideration only in the image reading process, but not in the image forming process. The width of the correction instrument 1 is measured as the number of pixels in the correction image.

The image read scaling factor error in the subsidiary scanning direction is calculated by Expression 7 below, since the width of the correction instrument 1 is set to be the same as the width in the width direction of the rectangular image 311 in the reference image 31.

(Image read scaling factor error in the subsidiary scanning direction)=(Number of pixels in the width direction of the correction instrument 1)÷(Number of pixels in the width direction of the rectangular image 311 in the reference image 31)   Expression 7

The calculated image read scaling factor error in the subsidiary scanning direction is stored into the non-volatile memory 403.

B. Measurement of Error in Image Forming Section 300

(1) Error in Image Formation Scaling Factor in Subsidiary Scanning Direction

In image data of the correction image read by the image reading section 200, the number of pixels of the distance L9 in the subsidiary scanning direction in each of the two rectangular images 311 and 312, is measured as in Example 1. The distance L9 thus measured is compared with a fourth reference value. The fourth reference value is an interval between the two rectangular images 311 and 312 in the reference image 31 stored in the image memory 404. Based on the result of the measurement, an error in an image formation scaling factor in the subsidiary scanning direction is calculated by:

(Image formation scaling factor error in the subsidiary scanning direction)=L9÷V+(Image read scaling factor error in the subsidiary scanning direction)   Expression 8.

<Correction of Error>

A. Correction of Error in Image Reading Process in Scanner Mode

In a scanner mode in which the image forming apparatus 100 is used as a scanner, and image data read by the image reading section 200 is output to an external apparatus, such as a personal computer or the like, a size in the subsidiary scanning direction of the image data read by the image reading section 200 is corrected by multiplying with the reciprocal of an error in an image read scaling factor in the subsidiary scanning direction. The image read scaling factor is corrected by so-called electronic zooming in which enlargement/reduction is performed within an image memory.

Note that, along with the corrected image data, data indicating the image read scaling factor error in the subsidiary scanning direction can be output.

B. Correction of Error in Image Forming Process in Printer Mode

In a printer mode in which the image forming apparatus 100 is used as a printer, and an image is formed on paper in the image forming section 300 based on image data input from an external apparatus, such as a personal computer or the like, a size in the subsidiary scanning direction of the image data input from the external apparatus is corrected by multiplying with the reciprocal of an error in an image formation scaling factor in the subsidiary scanning direction, and the resultant image is formed on paper. Enlargement/reduction of an image is performed by so-called electronic zooming in which image data is enlarged or reduced within an image memory.

C. Correction of Error in Image Reading Process and Image Forming Process in Copier Mode In a copier mode in which the image forming apparatus 100 is used as a copier, and an image is formed on paper in the image forming section 300 based on image data read by the image reading section 200, a size in the subsidiary scanning direction of the image data read by the image reading section 200 is enlarged or reduced using the reciprocal (correction scaling factor) of a scaling factor obtained by multiplying an error (scaling factor) in an image read scaling factor in the subsidiary scanning direction and an error (scaling factor) in an image formation scaling factor in the subsidiary scanning direction, and the resultant image is formed on paper.

Note that, when a copy scaling factor is set to be other than 100% (one-to-one ratio), an image is enlarged or reduced by an electronic zoom process by a scaling factor obtained by multiplying the correction scaling factor with the copy scaling factor, and the resultant image is formed on paper. Also, a scaling factor obtained by multiplying the image read scaling factor error in the subsidiary scanning direction with the image formation scaling factor error in the subsidiary scanning direction can be stored as an image scaling factor in the subsidiary scanning direction in the non-volatile memory 403.

EXAMPLE 4

Hereinafter, a method for correcting the image read scaling factor error in the subsidiary scanning direction, which is different from that of Example 3 described above, will be described.

Figure 11:
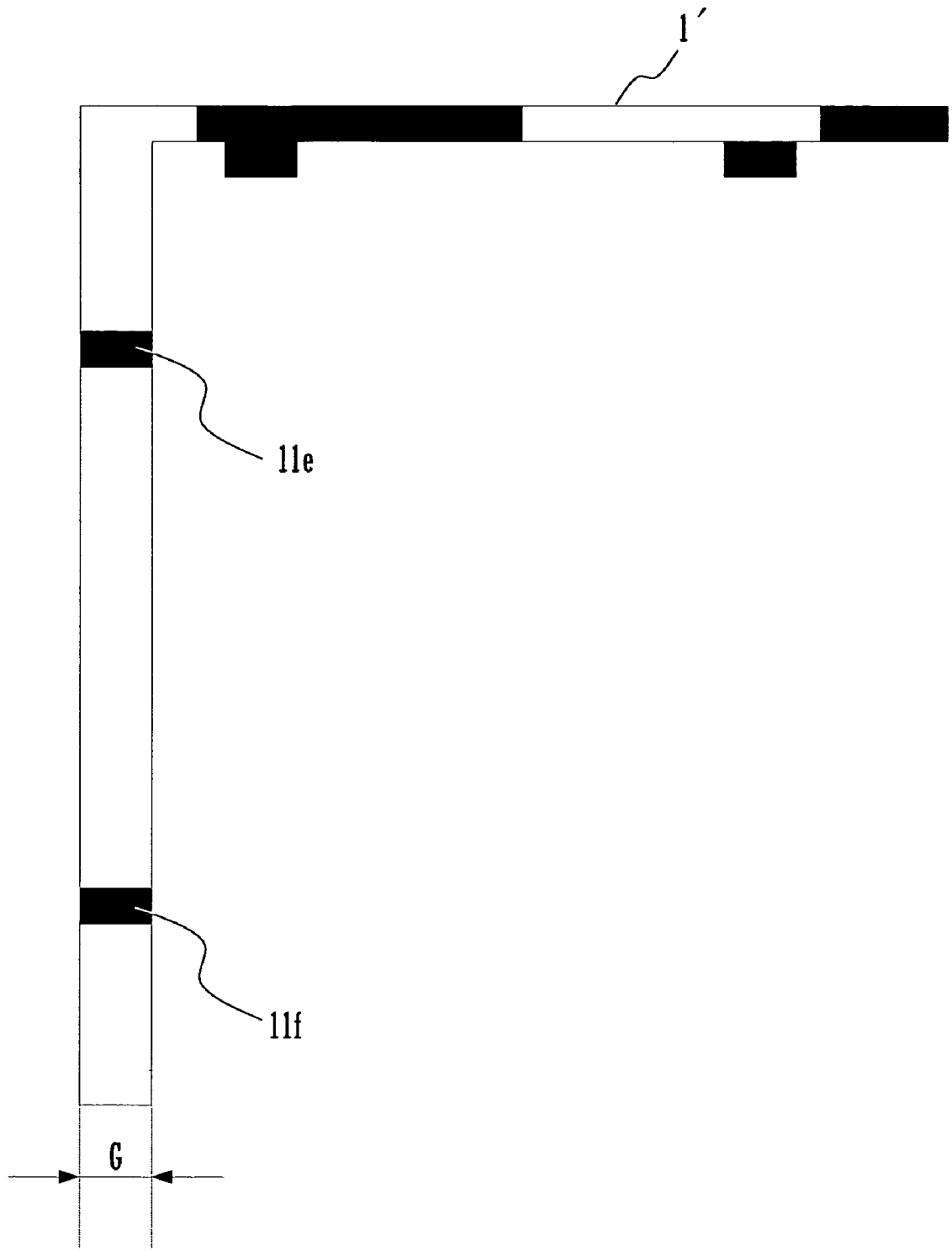
FIG. 11 is a bottom view illustrating a correction instrument according to another embodiment of the present invention which is used in an image position correcting task of the image forming apparatus.

(1) An L-shaped correction instrument 1' whose bottom side is colored as illustrated in FIG. 11 is used instead of the linear correction instrument 1. On the bottom side of the correction instrument 1', two black portions 11e and 11f corresponding to the two rectangular images 311 and 312 in the reference image 31 is formed in addition to a second black portion 11a, a first white portion 11b, a first black portion 11c, and a second white portion 11d which are similar to those of the correction instrument 1. The correction instrument 1' is placed along with paper on which the reference image 31 is formed in the image forming apparatus 100, on the original platen 210, and a correction image is read. The correction image includes the reference image 31 of the paper 41 and a reference image 34 of the correction instrument 1'.

(2) Instead of paper on which the reference image 31 is formed, paper having a standard size, such as A4 or the like, on which no image is formed, is placed along with the correction instrument 1 or the correction instrument 1' on the original platen 210, a distance between two parallel edges of the paper is measured in the read correction image. The result of the measurement is compared with the width and length of A4-size paper, thereby making it possible to obtain an error in an image read scaling factor.

In this case, the image read scaling factor can be easily adjusted without using the reference image. However, there is a possibility that the result of the error measurement is affected by an error in paper size.

(3) By coloring a bottom side of a surrounding of the original platen 210 as with the bottom side of the correction instrument 1 or 1', the correction instrument 1 or 1' can be omitted.

EXAMPLE 5

In the image forming apparatus 100 of Examples 1 to 3, an original is assumed to be placed with reference to the middle in the main scanning direction of the original platen 210. Alternatively, the present invention can be applied to the case where an edge in the main scanning direction of the original platen 210 is used as a reference in the image forming apparatus 100.

EXAMPLE 6

The configuration of the reference images 31 to 34 of the above-described examples is not limited to that of the examples. Also, although the colors of the reference images 31 to 34 are black and white, any other colors may be used as long as a boundary is recognizable. In addition, a mark identifying a reference image (e.g., a bar code, etc.) may be added to each of the reference images 31 to 34. In addition, in order to know a size of a reference image, identifiable data indicating the size may be added to the reference image, or alternatively, a description of how to use a reference image may be added into a portion of the reference image.

EXAMPLE 7

Hereinafter, other methods of correcting an error will be described.

(1) Method of Correcting Error in Read Start Position in Main Scanning Direction and Subsidiary Scanning Direction Read start position errors (correction amounts) in the main scanning direction and the subsidiary scanning direction can be represented by not only the number of pixels, but also a time (read start timing) or a distance. Also, the ordinal number of a pixel to be started after correction on an image memory can be indicated. As a correction method, a position of image data on the image memory is shifted.

(2) Method of Correcting Errors in Read Scaling Factors in the Main Scanning Direction and the Subsidiary Scanning Direction (i) Read image data is stored into an image memory without correcting a scaling factor, and when the image data is output, an area of the image memory which stores the image data is converted into a state free from a read scaling factor error, thereby performing scaling factor correction.

(ii) The read image data which is converted with the corrected scaling factor is stored in the image memory, and when the image data is output, the image data in the image memory is output as it is.

(3) Method of Correcting Error in Image Formation Start Position in Main Scanning Direction (i) When image data is stored into an image memory and when the image data is output from the image memory, an error is not corrected, and image formation start timing is corrected in an image forming apparatus, such as a laser printer or the like.

(ii) When image data is stored into an image memory, correction is not performed. When the image data is output from the image memory, the position of the image data is shifted.

(iii) When image data is stored into an image memory, the image data is shifted to a corrected position. When the image data is output, the image data in the image memory is output as it is.

(4) Method of Correcting Error in Image Formation Start Position in Subsidiary Scanning Direction In addition to the method for correcting an error in an image formation start position in the main scanning direction, a method for changing timing of transporting paper can be changed.

(5) Method of Correcting Error in Image Formation Scaling Factor in Main Scanning Direction (i) When image data is output from an image memory, a position of the image data is converted.

(ii) The image data is converted into a correct position, and the resultant image data is stored into an image memory. When the image data is output, the image data in the image memory is output as it is.

(8) Method of Correcting Error in Image Formation Scaling Factor in the Subsidiary Scanning Direction In addition to the method for correcting an error in an image formation starting position in the main scanning direction, a method for changing a speed of transporting paper can be changed.

EXAMPLE 8

In Example 1, the first reference images 31 and 32 are stored in an external apparatus, such as a personal computer or the like, and when the image position correcting task is performed, the reference images are transmitted from the external apparatus connected to the image forming apparatus. Alternatively, the following method can be employed.

(1) The reference image is stored in a non-volatile memory in the image forming apparatus. When the image position correcting task is performed, the reference image is read from the non-volatile memory (reference image information reading step). Thereby, the present invention can be carried out when a serviceman performs maintenance.

(2) The reference image is stored in an external recordable recording medium, such as a FD, a CD, or the like. When the image position correcting task is performed, the reference image is read from the recording medium (reference image information reading step).

The invention claimed is:

1. An image position correcting method comprising:
a reference image forming step in which an image forming section forms an image on a sheet based on a first reference image, the first reference image including an image which is used for measurement of an image formation position error and an image formation scaling factor error;
a correction image reading step in which an image reading section reads, as an correction image, the image of the sheet along with an image of a reference object based on which a second reference image is formed, the second reference image including an image for use in measurement of an image read position error and an image read scaling factor error, the sheet and the reference object being placed at respective predetermined positions on the original platen;
an image reading section error measuring step in which a control section measures the image read position error and the image read scaling factor error in the image reading section, based on a difference between the second reference image and the image of the reference object contained by the correction image; and
an image forming section error measuring step in which the control section measures the image formation position error and the image formation scaling factor error, based on a difference between the first reference image and the image of the sheet contained by the correction image with reference to the measured image read position error and image read scaling factor error.

2. The image position correcting method according to claim 1, further comprising a reference image information inputting step of storing image information concerning the first reference image received from an external device into an internal memory before the reference image forming step.

3. The image position correcting method according to claim 1, further comprising a reference image information reading step of reading image information concerning the first reference image from an internal non-volatile memory before the reference image forming step.

4. The image position correcting method according to claim 1, further comprising a reference image information reading step of storing image information concerning the first reference image read from an external recording medium into an internal memory before the reference image forming step.

5. The image position correcting method according to claim 1, further comprising an original placing step of placing paper on which the first reference image is formed in the reference image forming step, at a predetermined position on the original platen, with an image correcting instrument having a bottom side on which the second reference image is formed, before the correction image reading step.

6. The image position correcting method according to claim 1, wherein
the first reference image includes an image indicating a center position in a main scanning direction; an image having a predetermined length in the main scanning direction; and an image having a predetermined length in a subsidiary scanning direction, and wherein
the second reference image includes an image indicating the center position in the main scanning direction; an image having a predetermined length in the main scanning direction; and an image having a predetermined length in the subsidiary scanning direction.

7. The image position correcting method according to claim 6, wherein the image reading section error measuring step is a step of comparing the image of the bottom of the image correcting instrument read by the image reading section with the second reference image in the internal memory.

8. The image position correcting method according to claim 1, wherein the image forming section error measuring step is a step of removing the error in the image forming section measured in the image reading section error measuring step from a result of comparison of the first reference image read by the image reading section in the correction image reading step with the first reference image information stored in the internal memory.

9. The image position correcting method according to claim 1, further comprising:
an image reading section correction information creating step of creating correction information for correcting image information read by the image reading section based on the image read position error and the image read scaling factor error and storing the correction information into an internal memory, after the image reading section error measuring step; and
an image forming section correction information creating step of creating correction information for correcting image information to be supplied to the image forming section based on the image formation position error and the image formation scaling factor error and storing the correction information into the internal memory, after the image forming section error measuring step.

10. The image position correcting method according to claim 9, wherein the image reading section correction information creating step is a step of creating image reading start position information used when the image information read by the image reading section is read from an image memory, and creating image read scaling factor information used when the image information read by the image reading section is enlarged or reduced in the image memory.

11. The image position correcting method according to claim 9, wherein the image forming section correction information creating step is a step of creating image formation start position information used when the image information is drawn in the image forming section, image formation scaling factor information used when the image information is enlarged or reduced in an image memory, and paper transport speed information used when paper is transported in the image forming section.

12. An image position correcting method comprising:
a reference image forming step of forming a first reference image including an image which is used for measurement of an error in an image formation position and an error in an image formation scaling factor, on paper in an image forming section;
a first correction image reading step of reading an image of paper placed at an appropriate position on a first original platen after the formation of the first reference image, along with a second reference image including an image for use in measurement of an error in an image read position and an error in an image read scaling factor, the image being provided at an appropriate position on the first original platen, as a first image for correction, in an image reading section;
a second correction image reading step of reading an image of the paper transported via a second original platen after the formation of the first reference image, as a second image for correction, in a moving image reading section;
a fixed image reading section error measuring step of measuring an error in an image read position and an error in an image read scaling factor in the fixed image reading section based on the second reference image in the first correction image, in a control section;
an image forming section error measuring step of measuring an error in an image formation position and an error in an image formation scaling factor in the image forming section based on the image read position error and image read scaling factor error in the fixed image reading section and the first reference image in the first correction image, in the control section; and
a moving image reading section error measuring step of measuring an error in an image read position and an error in an image read scaling factor in the moving image reading section based on the image formation position error and the image formation scaling factor error in the image forming section and the first reference image in the second correction image, in the control section.

13. The image position correcting method according to claim 12, wherein:
the reference image forming step is a step of forming a top-side first reference image and a bottom-side first reference image on a top side and a bottom side of the paper, respectively;
the first correction image reading step is a step of reading an image of at least one of the top and bottom sides of the paper placed at an appropriate position on the first original platen, along with the second reference image, as the first correction image;
the second correction image reading step is a step of reading an image of each of the top and bottom sides of the paper as a top-side second correction image and a bottom-side second correction image, the paper being transported via the second original platen with the top and bottom sides thereof being reversed;

the moving image reading section error measuring step is a step of measuring an error in an image read position and an error in an image read scaling factor in the moving image reading section when a top-side image is read and when a bottom-side image is read, based on the image formation position error and the image formation scaling factor error in the image forming section and the top-side first reference image in the top-side second correction image and the bottom-side first reference image in the bottom-side second correction image.

14. The image position correcting method according to claim 12, wherein:
the image forming section error measuring step is a step of removing the error in the fixed image reading section measured in the fixed image reading section error measuring step from a result of comparison of the first reference image read by the fixed image reading section in the first correction image reading step with the first reference image information stored in an internal memory; and
the moving image reading section error measuring step is a step of removing the error in the image forming section measured in the image forming section error measuring step from a result of comparison of the first reference image read by the moving image reading section in the second correction image reading step with the first reference image information stored in the internal memory.

15. The image position correcting method according to claim 12, further comprising, after at least the moving image reading section error measuring step, a moving image reading section correction information creating step of creating correction information for correcting image information read by the moving image reading section based on the image read position error and the image read scaling factor error in the moving image reading section, and storing the correction information into an internal memory.

16. The image position correcting method according to claim 15, wherein the moving image reading section correction information creating step is a step of creating transport start timing information for determining timing of starting transportation of an original with respect to the second original platen, and transport speed information for determining a transport speed of the original with respect to the second original platen.

17. An image position correcting instrument, wherein:
the image position correcting instrument is placed along with paper on which a first reference image including an image for use in measurement of an error in an image formation position and an error in an image formation scaling factor is formed, on an original platen, when an image position correcting task is performed in an image forming apparatus; and
the image position correcting instrument has an elongate shape, having a width equal to a width in the subsidiary scanning direction of at least one image included in the first reference image and a length shorter than a length in the main scanning direction of the original platen of the image forming apparatus, a reference position with respect to the original platen of the image forming apparatus is inscribed on an upper surface of the image position correcting instrument, and a second reference image for use in measurement of an error in an image read position and an error in an image read scaling factor in an image position correcting task of the image forming apparatus is inscribed on a lower surface of the image position correcting instrument, and the image position correcting instrument includes a pressing member for pressing an original onto the upper surface of the original platen.

18. An image forming apparatus comprising an image reading section for reading image information of an original placed on an original platen, an image forming section for forming an output image based on the image information on paper, and a control section for controlling operations of the image reading section and the image forming section, wherein:

the image forming section forms an image on the paper, based on image information of a first reference image including an image for use in measurement of an error in an image formation position and an error in an image formation scaling factor, in an image position correcting task;

the image reading section reads an image of paper placed at an appropriate position on the original platen after an image is formed based on the image information of the first reference image, along with a second reference image including an image for use in measurement of an error in an image read position and an error in an image read scaling factor, the image being provided at an appropriate position on the original platen, as an image for correction, in the image position correcting task; and the control section performs, in the image position correcting task, an image reading section error measuring process of measuring the image read position error and the image read scaling factor error in the image reading section based on the second reference image in the correction image, an image forming section error measuring process of measuring the image formation position error and the image formation scaling factor error in the image forming section based on the measured image read position error and image read scaling factor error and the first reference image in the correction image, an image reading section correction information creating process of creating image reading section correction information for correcting image information read by the image reading section based on the image read position error and the image read scaling factor error, and storing the image reading section correction information into an internal memory, and an image forming section correction information creating process of creating image forming section correction information for correcting image information to be supplied to the image forming section, based on the image formation position error and the image formation scaling factor error, and storing the image forming section correction information into the internal memory.

19. The image forming apparatus according to claim 18, wherein, when outputting image information read by the image reading section in an image reading task other than in the image position correcting task to an external apparatus, the control section corrects an image position and an image scaling factor of the image information read by the image reading section using the image reading section correction information stored in the internal memory.

20. The image forming apparatus according to claim 18, wherein, when forming an image on paper in the image forming section based on image information input from an external apparatus other than in the image position correcting task, the control section corrects an image position and an image scaling factor of the image information input from an external apparatus based on the image forming section correction information stored in the internal memory.

21. The image forming apparatus according to claim 18, wherein, when an image is formed on paper in the image forming section based on image information read by the image reading section in an image reading task other than in the image position correcting task, the control section corrects an image position and an image scaling factor of the image information read by the image reading section using the image reading section correction information and the image forming section correction information stored in the internal memory.

22. An image forming apparatus comprising a fixed image reading section for reading image information of an original placed on a first original platen, a moving image reading section for reading image information of the original transported via a second original platen, an image forming section for forming an output image based on the image information on paper, and a control section for controlling operations of the fixed image reading section, the moving image reading section, and the image forming section, wherein:

the image forming section forms an image on the paper, based on image information of a first reference image including an image for use in measurement of an error in an image formation position and an error in an image formation scaling factor, in an image position correcting task;

the fixed image reading section reads an image of the paper placed at an appropriate position on the first original platen after an image is formed based on the image information of the first reference image, along with a second reference image including an image for use in measurement of an error in an image read position and an error in an image read scaling factor, the image being provided at an appropriate position on the first original platen, as a first image for correction, in the image position correcting task;

the moving image reading section reads an image of the paper transported via the second original platen after an image is formed based on the image information of the first reference image, in the image position correcting task;

the control section performs, in the image position correcting task, a fixed image reading section error measuring process of measuring the image read position error and the image read scaling factor error in the fixed image reading section based on the second reference image in the first correction image, an image forming section error measuring process of measuring the image formation position error and the image formation scaling factor error in the image forming section based on a result of measurement of the image read position error and the image read scaling factor error in the fixed image reading section and the first reference image in the first correction image, a moving image reading section error measuring process of measuring the image read position error and the image read scaling factor error in the moving image reading section based on a result of measurement of the image formation position error and the image formation scaling factor error in the image forming section and the first reference image in the second correction image, a fixed image reading section correction information creating process of creating fixed image reading section correction information for correcting an error occurring in the fixed image reading section based on the error measured in the fixed image reading section error measuring process, and storing the fixed image reading section correction information into an internal memory, an image forming section correction information creating process of creating image forming section correction information for correcting an error occurring in the image forming section, based on the error measured in the image forming section error measuring process, and storing the image forming section correction information into the internal memory, and a moving image reading section correction information creating process of creating moving image reading section correction information for correcting an error occurring in the moving image reading section based on the error measured in the moving image reading section error measuring process, and storing the moving image reading section correction information into the internal memory.

23. The image forming apparatus according to claim 22, wherein:

the moving image reading section has a function to read images on both sides of an original, wherein the top and bottom sides of the original are successively transported via the second original platen;

the reference image forming process is a process of forming the top-side first reference image and the bottom-side first reference image on the top and bottom sides of the paper, respectively;

the first correction image reading process is a process of reading an image of at least one of the top and bottom sides of the paper placed at an appropriate position on the first original platen, along with the second reference image, as the first correction image;

the second correction image reading process is a process of reading images of the top and bottom sides of the paper, the paper being transported via the second original platen with the top and bottom sides thereof being reversed, as a top-side second correction image and a bottom-side second correction image, respectively; and the moving image reading section error measuring process is a process of measuring an error in an image read position and an error in an image read scaling factor in top-side image reading and bottom-side image reading in the moving image reading section, based on the image formation position error and the image formation scaling factor error in the image forming section, the top-side first reference image in the top-side second correction image, and the bottom-side first reference image in the bottom-side second correction image.

* * * * *